(12) United States Patent
Aljubeh et al.

(10) Patent No.: US 12,462,506 B2
(45) Date of Patent: Nov. 4, 2025

(54) 3D MODELS FOR AUGMENTED REALITY (AR)

(71) Applicant: Snap Inc., Santa Monica, CA (US)

(72) Inventors: Marwan Aljubeh, London (GB); Gregory James Bakker, Clapham (GB); Eric Nersesian, Summit, NJ (US); Supannee Tanathong, London (GB); Yanli Zhao, London (GB)

(73) Assignee: Snap Inc., Santa Monica, CA (US)

( * ) Notice: Subject to any disclaimer, the term of this patent is extended or adjusted under 35 U.S.C. 154(b) by 156 days.

(21) Appl. No.: 18/062,393

(22) Filed: Dec. 6, 2022

(65) Prior Publication Data
US 2023/0177788 A1    Jun. 8, 2023

Related U.S. Application Data

(60) Provisional application No. 63/368,600, filed on Jul. 15, 2022, provisional application No. 63/286,433, filed on Dec. 6, 2021.

(51) Int. Cl.
*G06T 19/20* (2011.01)
*G06T 7/579* (2017.01)
(Continued)

(52) U.S. Cl.
CPC .............. *G06T 19/20* (2013.01); *G06T 7/579* (2017.01); *G06T 7/70* (2017.01); *G06T 19/006* (2013.01);
(Continued)

(58) Field of Classification Search
CPC ......... G06T 19/20; G06T 7/70; G06T 19/006; G06T 2219/2004
See application file for complete search history.

(56) References Cited

U.S. PATENT DOCUMENTS

| 6,009,190 A | 12/1999 | Szeliski et al. |
| 6,525,731 B1 | 2/2003 | Suits et al. |

(Continued)

FOREIGN PATENT DOCUMENTS

| CN | 113366413 A | 9/2021 |
| CN | 118355407 A | 7/2024 |

(Continued)

OTHER PUBLICATIONS

"Application Serial No. PCT/US2022/081002, Written Opinion Mailed Nov. 16, 2023", 9 pgs.
(Continued)

*Primary Examiner* — Ryan R Yang
(74) *Attorney, Agent, or Firm* — Schwegman Lundberg & Woessner, P.A.

(57) ABSTRACT

The present disclosure provides a method for creating a 3D model of a reference surface. The method includes capturing, using a capture device, a plurality of data points on the reference surface, determining a position and an orientation of the capture device related to the capture of the plurality of data points, creating a 3D data representation of the reference surface based on the plurality of data points, creating a location tracking data representation of the reference surface based the plurality of data points on the reference surface and the position and the orientation of the capture device, and creating the 3D model of the reference surface based on the 3D data representation and the location tracking data representation of the reference surface.

14 Claims, 19 Drawing Sheets

(51) Int. Cl.
    *G06T 7/70*     (2017.01)
    *G06T 19/00*     (2011.01)
    *G06F 3/0482*     (2013.01)

(52) U.S. Cl.
    CPC ........ *G06F 3/0482* (2013.01); *G06T 2200/08* (2013.01); *G06T 2200/24* (2013.01); *G06T 2219/2004* (2013.01)

(56) References Cited

U.S. PATENT DOCUMENTS

| | | | |
|---|---|---|---|
| 8,438,163 | B1 | 5/2013 | Li et al. |
| 9,652,896 | B1 | 5/2017 | Jurgenson et al. |
| 9,984,499 | B1 | 5/2018 | Jurgenson et al. |
| 10,290,049 | B1 | 5/2019 | Xu et al. |
| 10,657,708 | B1 | 5/2020 | Jurgenson et al. |
| 10,810,782 | B1 | 10/2020 | Cowburn et al. |
| 10,997,760 | B2 | 5/2021 | Berger et al. |
| 11,107,255 | B2 | 8/2021 | Li et al. |
| 11,176,737 | B2 | 11/2021 | Hare et al. |
| 12,159,363 | B2 | 12/2024 | Aljubeh et al. |
| 2004/0095357 | A1 | 5/2004 | Oh et al. |
| 2005/0001852 | A1 | 1/2005 | Dengler et al. |
| 2007/0043616 | A1 | 2/2007 | Kutaragi et al. |
| 2011/0170768 | A1 | 7/2011 | Alldrin et al. |
| 2012/0058782 | A1 | 3/2012 | Li |
| 2012/0195471 | A1 | 8/2012 | Newcombe et al. |
| 2012/0196679 | A1 | 8/2012 | Newcombe et al. |
| 2012/0212509 | A1 | 8/2012 | Benko et al. |
| 2012/0306850 | A1 | 12/2012 | Balan et al. |
| 2013/0044128 | A1 | 2/2013 | Liu et al. |
| 2013/0155058 | A1 | 6/2013 | Golparvar-fard et al. |
| 2014/0206443 | A1 | 7/2014 | Sharp et al. |
| 2015/0077427 | A1 | 3/2015 | Dumitras et al. |
| 2015/0145865 | A1 | 5/2015 | Barnett et al. |
| 2016/0140757 | A1* | 5/2016 | Voth ........................ G06T 17/00 345/419 |
| 2016/0210761 | A1 | 7/2016 | Pollefeys et al. |
| 2016/0266386 | A1 | 9/2016 | Scott et al. |
| 2016/0350833 | A1 | 12/2016 | Andon |
| 2016/0350930 | A1 | 12/2016 | Lin et al. |
| 2016/0371884 | A1 | 12/2016 | Benko et al. |
| 2017/0064360 | A1 | 3/2017 | Houston et al. |
| 2017/0124713 | A1 | 5/2017 | Jurgenson et al. |
| 2017/0249752 | A1 | 8/2017 | Kotake |
| 2017/0278289 | A1 | 9/2017 | Marino et al. |
| 2018/0005015 | A1 | 1/2018 | Hou et al. |
| 2018/0103209 | A1 | 4/2018 | Fischler et al. |
| 2018/0190032 | A1 | 7/2018 | Barnett et al. |
| 2018/0210628 | A1 | 7/2018 | Mcphee et al. |
| 2018/0246515 | A1 | 8/2018 | Iwama et al. |
| 2019/0028637 | A1 | 1/2019 | Kolesov et al. |
| 2019/0043203 | A1 | 2/2019 | Fleishman et al. |
| 2019/0073832 | A1 | 3/2019 | Kim |
| 2019/0108396 | A1 | 4/2019 | Dal Mutto et al. |
| 2019/0147220 | A1 | 5/2019 | Mccormac et al. |
| 2019/0156534 | A1 | 5/2019 | Chen et al. |
| 2019/0258058 | A1 | 8/2019 | Fortin-Deschênes et al. |
| 2019/0377981 | A1 | 12/2019 | Veeravasarapu et al. |
| 2020/0020118 | A1 | 1/2020 | Chapdelaine-Couture et al. |
| 2020/0111267 | A1 | 4/2020 | Stauber et al. |
| 2020/0126300 | A1 | 4/2020 | Song et al. |
| 2020/0221070 | A1 | 7/2020 | Godar |
| 2020/0250858 | A1 | 8/2020 | Li et al. |
| 2020/0250889 | A1 | 8/2020 | Li |
| 2020/0302681 | A1 | 9/2020 | Totty et al. |
| 2020/0312008 | A1 | 10/2020 | Cowburn et al. |
| 2020/0334824 | A1 | 10/2020 | Bleyer et al. |
| 2020/0368616 | A1 | 11/2020 | Delamont |
| 2021/0012551 | A1 | 1/2021 | Cowburn et al. |
| 2021/0150719 | A1 | 5/2021 | Cowburn et al. |
| 2021/0199460 | A1* | 7/2021 | Yerli ........................ G01C 21/20 |
| 2021/0200776 | A1 | 7/2021 | Pounds et al. |
| 2021/0203727 | A1 | 7/2021 | Pounds et al. |
| 2021/0256765 | A1 | 8/2021 | Huo et al. |
| 2021/0295606 | A1 | 9/2021 | Kim et al. |
| 2021/0334993 | A1 | 10/2021 | Woodford |
| 2021/0343050 | A1 | 11/2021 | Li et al. |
| 2021/0390696 | A1 | 12/2021 | Iwase et al. |
| 2021/0398186 | A1 | 12/2021 | Tang et al. |
| 2022/0189108 | A1 | 6/2022 | Shandilya et al. |
| 2022/0239895 | A1 | 7/2022 | Bae et al. |
| 2022/0392167 | A1* | 12/2022 | Adkinson ............. G06T 17/205 |
| 2023/0177789 | A1 | 6/2023 | Aljubeh et al. |
| 2024/0013415 | A1* | 1/2024 | Tam ........................ G06V 40/10 |
| 2024/0020920 | A1 | 1/2024 | Aljubeh et al. |
| 2025/0046044 | A1 | 2/2025 | Aljubeh et al. |

FOREIGN PATENT DOCUMENTS

| | | |
|---|---|---|
| CN | 119547105 A | 2/2025 |
| EP | 3846124 A1 | 7/2021 |
| WO | WO-2020160245 A1 | 8/2020 |
| WO | WO-2020160261 A1 | 8/2020 |
| WO | WO-2020205435 A1 | 10/2020 |
| WO | WO-2023107932 A1 | 6/2023 |
| WO | WO-2024015917 A1 | 1/2024 |

OTHER PUBLICATIONS

"International Application Serial No. PCT/US2022/081002, International Search Report mailed Apr. 13, 2023", 3 pgs.

"International Application Serial No. PCT/US2022/081002, Response to Written Opinion and Article 34 Amendments filed Oct. 5, 2023", 15 pgs.

"International Application Serial No. PCT/US2022/081002, Written Opinion mailed Apr. 13, 2023", 7 pgs.

"International Application Serial No. PCT/US2023/070147, International Search Report mailed Nov. 29, 2023", 5 pgs.

"International Application Serial No. PCT/US2023/070147, Written Opinion mailed Nov. 29, 2023", 6 pgs.

Chew, W, et al., "Dynamic Strategy of Keyframe Selection with PD Controller for VSLAM Systems", IEEE/ASME Transactions on Mechatronics Institute of Electrical and Electronics Engineers Inc. USA vol. 27, No. 1, (Feb. 1, 2022), 115-125.

Juichung, Kuo, et al., "Redesigning SLAM for Arbitrary Multi-Camera Systems", arxiv.org, Cornell University Library, 201 Olin Library Cornell University Ithaca, NY 14853, (Mar. 4, 2020), 7 pgs.

U.S. Appl. No. 18/062,423, filed Dec. 6, 2022, Computer Vision Tools for Creating Augmented Reality (AR) Models.

"Landmarker Guide—Lens Studio by Snap Inc.", [Online] Retrieved from the Internet: <URL: https://lensstudio.snapchat.com/templates/landmarker/guide/>, (Dec. 5, 2021), 20 pgs.

Arefin, Mohammed Safayet, et al., "Effects of a Distracting Background and Focal Switching Distance in an Augmented Reality System", IEEE International Symposium on Mixed and Augmented RealityAdjunct (ISMAR-Adjunct). IEEE ISMAR, (2021), 96-99.

Barde, Amit, et al., "Less is More: Using Spatialized Auditory and Visual Cues for Target Acquisition in a Real-World Search Task", IEEE International Symposium on Mixed and Augmented Reality Adjunct (ISMAR-Adjunct). IEEE ISMAR, (2019), 340-341.

Campbell, John L, et al., "Coding In-depth Semistructured Interviews: Problems of Unitization and Intercoder Reliability and Agreement", Sociological Methods and Research, 42(3), (2013), 294-320.

Choudhary, Siddharth, et al., "SLAM with Object Discovery, Modeling and Mapping", 2014 IEEE/RSJ International Conference on Intelligent Robots and Systems, (2014), 8 pgs.

Czadzeck, Cameron, "Social Media Marketers: Here's Why Augmented Reality Matters", Optic Sky Productions, [Online] Retrieved from the Internet: <URL: https://web.archive.org/web/20211023234742/https://opticskypro.com/updates/social-media-marketers-heres-why-augmented-reality-matters/>, (Sep. 1, 2021), 8 pgs.

Elgendy, Mohamed, "Deep Learning for Vision Systems", Manning, New York, NY, USA, (2020), 480 pgs.

Feng, Qiaojun, et al., "Localization and Mapping using Instance-specific Mesh Models", 2019 IEEE/RSJ International Conference on Intelligent Robots and Systems (IROS), (2019), 7 pgs.

(56) References Cited

OTHER PUBLICATIONS

Lu, Weiquan, et al., "Subtle Cueing for Visual Search in Augmented Reality", IEEE International Symposium on Mixed and Augmented Reality (ISMAR). IEEE ISMAR, (2012), 161-166.

Reitmayr, Gerhard, et al., "Simultaneous Localization and Mapping for Augmented Reality", 2010 IEEE International Symposium on Ubiquitous Virtual Reality, (Jul. 2010), 5 pgs.

Syiem, Brandon Victor, et al., "Impact of Task on Attentional Tunneling in Handheld Augmented Reality", CHI Conference on Human Factors in Computing Systems (CHI '21), SIGCHI, (2021), 14 pgs.

Wang, Chieh-Chih, et al., "Simultaneous Localization, Mapping and Moving Object Tracking", The International Journal of Robotics Research, 26(9), (2007), 47 pgs.

"U.S. Appl. No. 18/062,423, Corrected Notice of Allowability mailed Oct. 3, 2024", 2 pgs.

"U.S. Appl. No. 18/062,423, Corrected Notice of Allowability mailed Oct. 25, 2024", 2 pgs.

"U.S. Appl. No. 18/062,423, Notice of Allowance mailed Jul. 22, 2024", 10 pgs.

"International Application Serial No. PCT/US2022/081002, International Preliminary Report on Patentability mailed Mar. 18, 2024", 11 pgs.

"International Application Serial No. PCT/US2022/081002, Response to Written Opinion filed Jan. 12, 2024", 5 pgs.

"U.S. Appl. No. 18/352,035, Non Final Office Action mailed May 7, 2025", 15 pgs.

"International Application Serial No. PCT/US2023/070147, International Preliminary Report on Patentability mailed Jan. 30, 2025", 8 pgs.

\* cited by examiner

3D MODELS FOR AUGMENTED REALITY (AR)

CROSS-REFERENCE TO RELATED APPLICATION

This application claims priority from U.S. Provisional Patent Application No. 63/286,433, filed Dec. 6, 2021, and entitled "3D Models for Augmented Reality (AR)" and from U.S. Provisional Patent Application No. 63/368,600, filed Jul. 15, 2022, and entitled "Incremental Scanning for Custom Landmarkers," which are herein incorporated by reference in their entireties.

BACKGROUND

Augmented reality (AR) may include using computer-generated enhancements to add new information to images in a real-time or near real-time fashion. For example, images of a real-world object on a display of a device may be enhanced with display details that are not present on the object but that are generated by an AR system to appear as if they are on or part of the object. AR systems require a complex mix of image capture information that is integrated and matched with the AR information to be added to a captured scene in a way that seeks to seamlessly present a final image from a perspective determined by the image capture device.

Various technologies may be used in AR rendering, including optical projection systems, monitors, handheld devices, and display systems worn on the human body, such as eyeglasses, contact lenses, or a head-up display (HUD).

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 2:
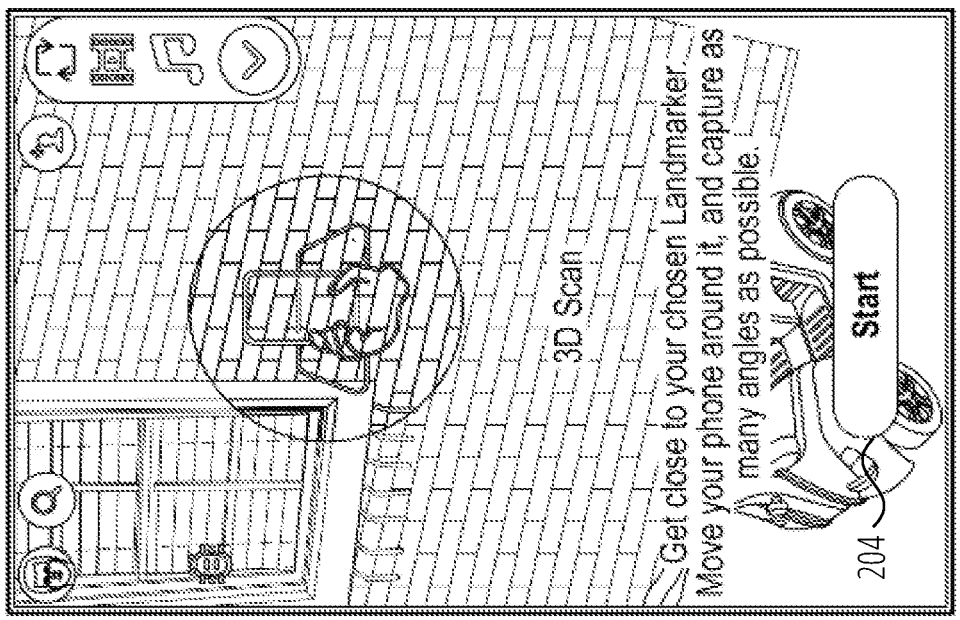
FIG. 2 illustrates a graphical user interface that is presented before starting a 3D mapping process, according to some examples.

Examples relate to methods and systems that allow users to generate three-dimensional (3D) models usable for augmented reality (AR) experiences using static features or objects in the world (e.g., building, store fronts, statues). These 3D models are then available in an authoring tool for creating AR experiences, which are shared with end-users as AR augmentations (e.g., "lenses").

For example, a user may scan a target static feature or object using a two-step process. First, an object scan results in two outputs:

a. a Simultaneous Localization And Mapping (SLAM) tracking model (as an example of a location tracking data representation or a computer vision (CV) model), and b. a 3D mesh (as an example of a 3D data representation).

The SLAM tracking model and the 3D mesh may be aligned with each other using a SLAM tracking system. In some examples, the SLAM tracking model and the 3D mesh may together constitute a 3D model of features or objects. The user may have an option of testing a scanning result and previewing sample applications on the scanning result. The user may also be able to upload the scanning result (e.g., the SLAM tracking model and the 3D mesh). Once uploaded, an ID is provided for the scanning result, and it is designated as a 3D model (for example, called a "custom 3D reference model"). Users of an augmentation creation application, who have that ID, then can create AR experiences that are tailored for the location of the scanned feature or object.

In some examples, the CV model is primary to the process and the 3D mesh model is secondary for visualization processes of the physical surfaces. The described processes may be implemented primarily as a CV workflow using the camera's images to record features and keyframes and secondly as a LiDAR process to record depth information to build the 3D mesh model. In some examples, the CV model and the 3D mesh model may be given equal weight in an overall process, and in some examples the 3D mesh model may be the primary output of a process.

Example systems and methods enable augmentation creators to create their own 3D reference models, which they can load into the augmentation creation application and publish as augmentations. The augmentations function such that an AR experience can be triggered at or proximate to a specific structure or object. An example use cases may include:

A user comes across a machine-readable code (e.g., a QR code or another barcode) on a storefront.

A user scans the machine-readable code and is presented with instructions to try to get the storefront inside the camera frame.

A user is presented with an AR experience customized for a particular location based on geolocation data In some examples, the types of structures supported by custom 3D reference models may be near-range structures where the scanning leverages Laser Imaging, Detection, and Ranging (LIDAR) as part of 3D reference model creation. For example, LIDAR may have a range limitation of a few meters.

In some examples, these custom 3D reference models are not distributed by default through any interface, map-based or otherwise. It is up to the augmentation developer to promote a 3D reference model augmentation through machine-readable codes, geofencing, or other means. 3D reference model augmentations may, for example, be used by brands to create engaging experiences at their physical stores and drive consumer traffic. Artists and creators may use 3D reference model augmentations to show off their creativity.

FIG. 1-FIG. 11 show graphical user interfaces for creating a custom AR landmarker or location, according to some examples. Specifically, FIGS. 2-5 relate to a 3D mapping process and FIGS. 6-9 relate to an area mapping process. The area mapping process and the 3D mapping process may be performed in any order. In some examples, either the area mapping process or the 3D mapping process may be omitted.

An augmentation creator (e.g., the scanner user) may access the "custom 3D reference model creator" augmentation utility of the application 1906. Through the augmentation creation process, the augmentation creator uses their LIDAR-enabled phone to create a map (e.g., composed of 3D markers and a 3D mesh) of a suitable target (e.g., a public statue or a storefront).

In the area mapping process (see interface 602, interface 702, interface 802, interface 902), the augmentation creator is instructed to build a map of the custom 3D reference model's area.

In the 3D mapping process, the augmentation creator is instructed on creating a 3D scan of the target structure or object (see interface 202, interface 302). During scanning, the augmentation creator receives feedback on the quality and completeness of the ongoing scan (see interface 402). After scanning is done, the augmentation creator is instructed to test the quality of their map in-augmentation (see interface 502).

After finishing the area mapping process and the 3D mapping process (in any order), the augmentation creator can upload their 3D reference model (see interface 1002, interface 1102) to a server.

The augmentation creator obtains a short, random, unique ID for their scanned 3D reference model (e.g., "2dbv-u2xz-4cjk") (see interface 1202). The augmentation creator is informed that this ID can be used to create 3D reference model augmentation for the 3D reference model they scanned and is given a link that provides further information (and a template) for creating such an augmentation.

Figure 1:
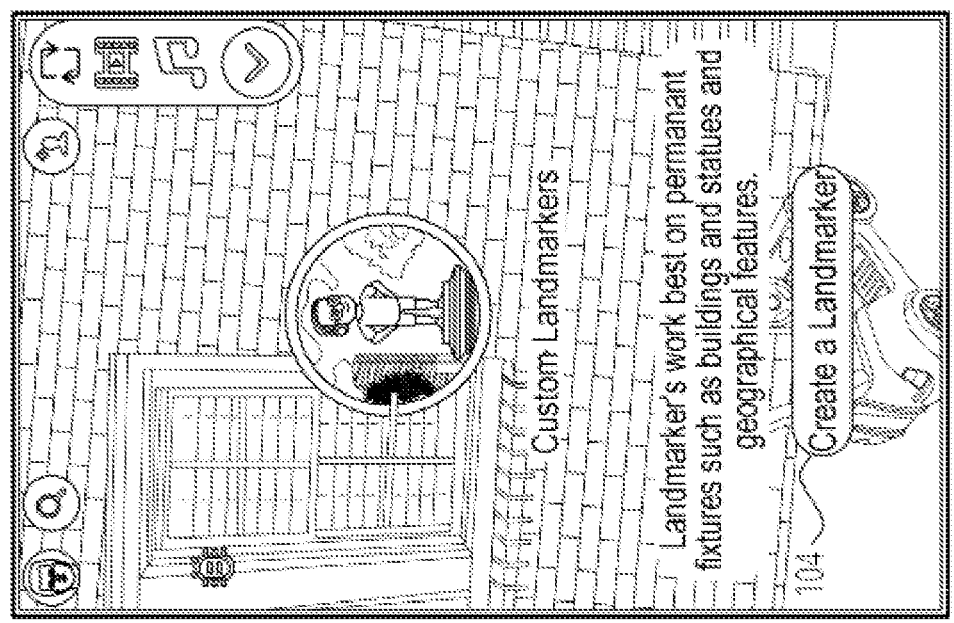
FIG. 1 illustrates an initial graphical user interface, according to some examples.

FIG. 1 illustrates an initial graphical user interface 102, according to some examples. The initial graphical user interface (GUI) 102 may be an initial GUI before beginning the example processes in the present disclosure. For example, when a user executes an application (APP) (e.g., application 1906) for creating a custom AR landmarker or location (also referred to as a custom 3D model or a 3D model), the GUI 102 may be the first GUI shown on a display of the user device by the APP. In some examples, creating a custom AR landmarker or location may be a function or module embedded in the APP. A user may run the function or module by clicking on certain virtual buttons displayed on the user device.

As shown in FIG. 1, the GUI 102 includes a real-time camera view and various visual representations. The visual representations may include images corresponding to the user and one or more icons corresponding to different functions of the APP, such as adding friends, sharing contents, adding background music to the AR landmarker/locations to be created, switching to another camera. The visual representations may also include an instruction on how to create an AR landmarker/location, such as "[l]andmarkers work best on permanent fixtures such as buildings and statues and geographical features." In some examples, the visual representations may include a virtual button 104 to create an AR landmarker/location. When a user presses the button 104, the process of creating the AR landmarker/location begins, and a GUI 202 in FIG. 2 is displayed.

FIG. 2 illustrates a graphical user interface 202 that is presented before starting a 3D mapping process, according to some examples. The GUI 202 is an initial GUI in the 3D mapping process. The GUI 202 presents a real-time camera view and various visual representations. The visual representations include an instruction about how to perform a 3D mapping process, such as "[g]et close to your chosen landmarker. Move your phone around it, and capture as many angles as possible." The GUI 202 also includes a virtual button 204 for beginning the 3D mapping process. When a user presses the button 204, the area mapping process begins, and GUI 302 shown in FIG. 3 is displayed.

Figure 3:
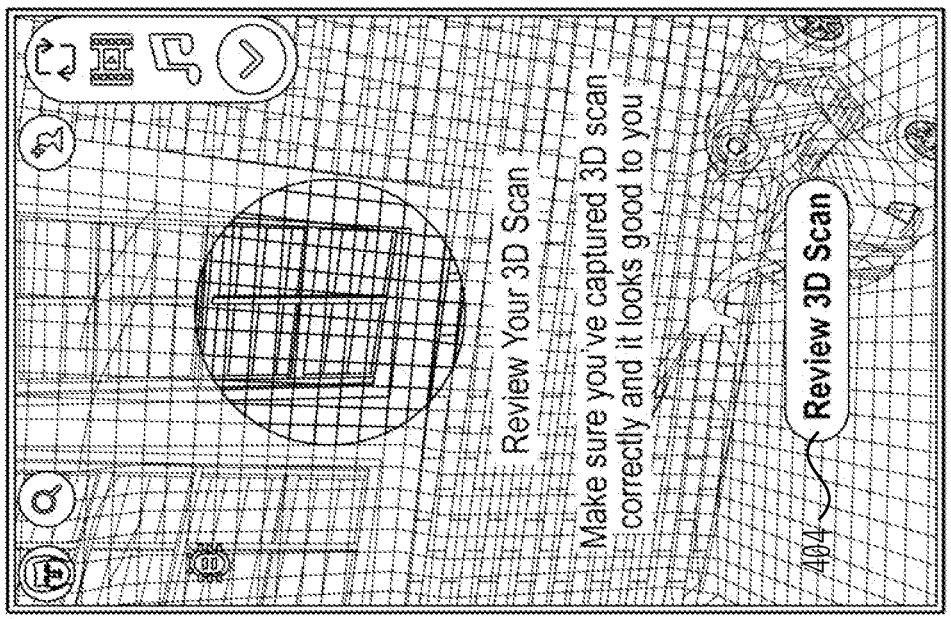
FIG. 3 illustrates a graphical user interface presented during a 3D mapping process, according to some examples.

FIG. 3 illustrates a graphical user interface (GUI) 302 presented during a 3D mapping process, according to some examples. As shown in FIG. 3, the GUI 302 includes a real-time camera view and 3D meshes 304 superimposed on a reference surface of a reference object (e.g., walls, windows, doors, cars) in the real-time view. The 3D meshes 304 are automatically generated when a user moves the camera around the reference object. In some examples, the 3D meshes 304 correspond to the sparse points 704 in FIG. 7. Alternatively, the 3D meshes 304 are generated based on newly captured points on the reference surface. The camera may include a LIDAR camera, a visible light camera, an infrared camera, etc.

The GUI 302 may include a virtual button 306 such that a user may press to indicate that the 3D mapping process is finished, for example when the user gauges that sufficient 3D meshes have been generated to cover the reference surface. Alternatively, a scanning application may automatically determine that sufficient 3D meshes have been generated and terminate the 3D mapping process. When the 3D mapping process is terminated, the GUI 402 is displayed.

Figure 4:
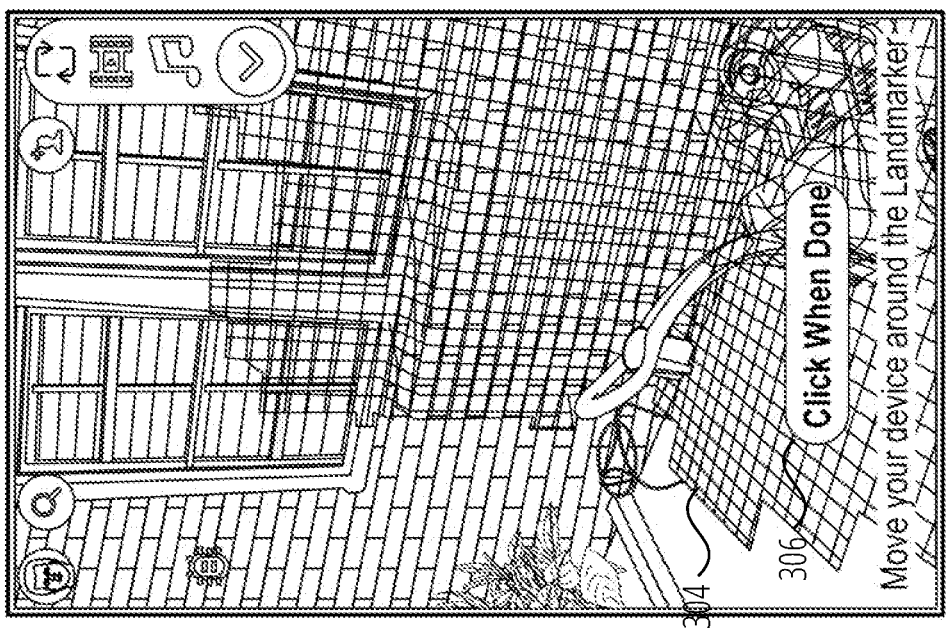
FIG. 4 illustrates a graphical user interface that is presented after a 3D mapping process, according to some examples.
Figure 6:
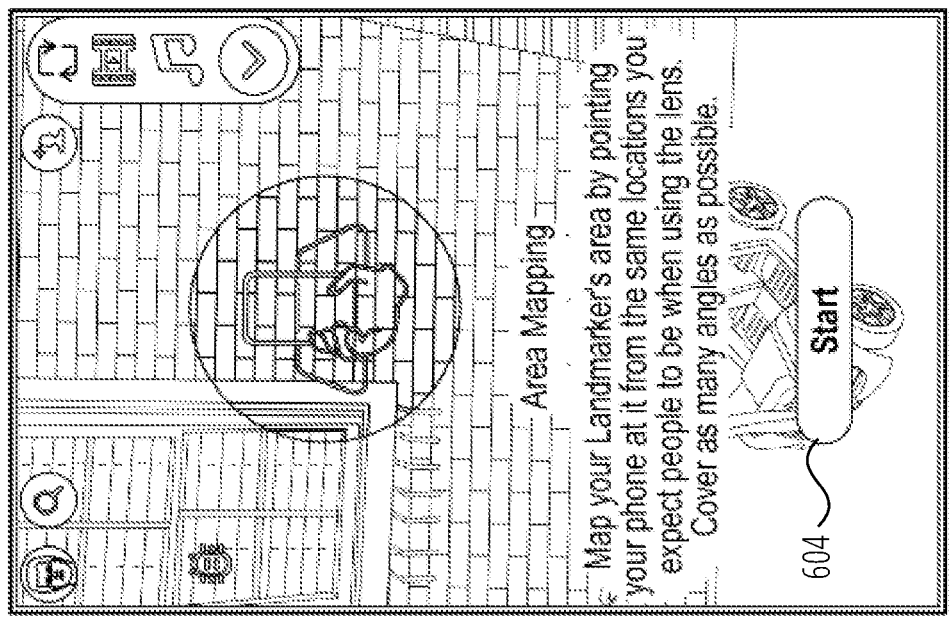
FIG. 6 illustrates a graphical user interface that is generated and displayed before starting an area mapping process, according to some examples.
Figure 5:
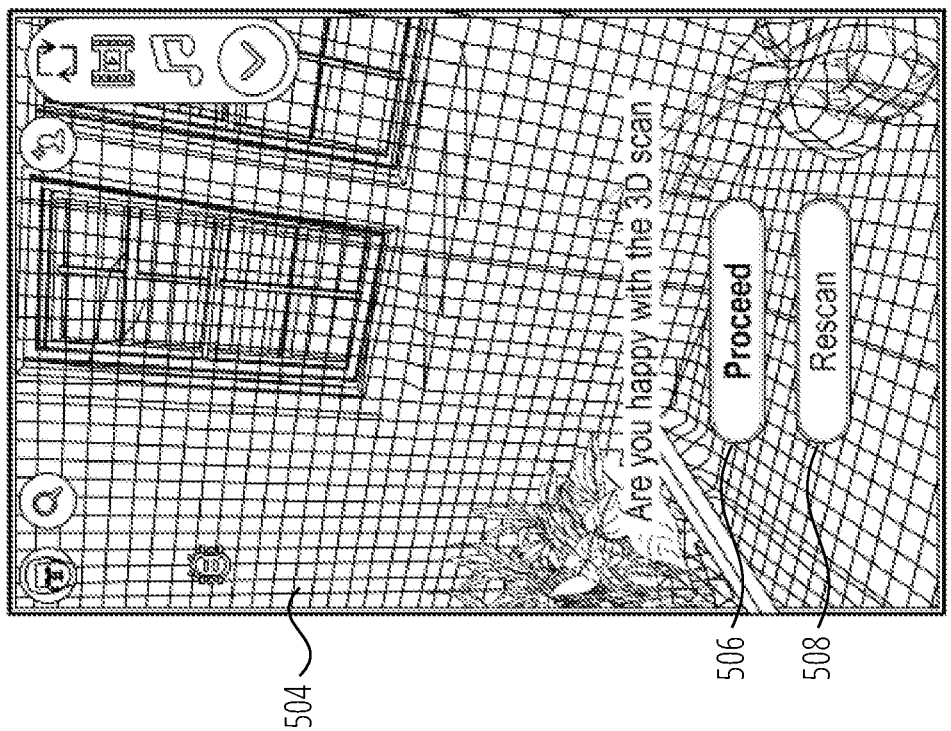
FIG. 5 illustrates a graphical user interface to facilitate reviewing an 3D mapping process, according to some examples.

FIG. 4 illustrates a graphical user interface (GUI) 402 that is presented after a 3D mapping process, according to some examples. The GUI 402 may be shown after a 3D mapping process is finished. The GUI 402 presents a real-time camera view and various visual representations. The visual representations include an instruction on how a result of 3D mapping process can be reviewed, such as "[m]ake sure you've captured 3D scan correctly and it looks good to you." The visual representations also include a virtual button 404. When a user presses the button 404, the reviewing process begins and the GUI 502 in FIG. 5 is displayed. In some examples, the GUI 402 includes a virtual button (not shown in figure) to skip the reviewing process. If a user presses the button to skip the reviewing process, the GUI 602 in FIG. 6 is displayed.

FIG. 5 illustrates a graphical user interface (GUI) 502 to facilitate reviewing a 3D mapping process, according to some examples. As shown in FIG. 5, the GUI 502 presents a real-time camera view and 3D meshes 504 superimposed on the real-time view. The 3D meshes 504 may be similar to the 3D meshes 304 in FIG. 3. When a user moves the camera around or across the reference surface of the reference object, the user can assess whether the 3D meshes on different regions of the reference surface look sufficient and correct.

The GUI 502 further includes visual representations of a question about the 3D mapping process such as "[a]re you happy with the 3D scan?" and two virtual buttons 506 and 508 that correspond to "proceed" and "rescan," respectively. When a user presses the button 506, a 3D data representation is automatically generated based on the 3D meshes 304 or 3D meshes 504. Then the GUI 602 in FIG. 6 is displayed. When a user presses the button 508, the GUI 302 in FIG. 3 is displayed and the 3D mapping process is reperformed.

In some examples, GUIs 402 and 502 are not shown. In other words, the 3D data representation is directly generated without requiring the user to review the result of the 3D mapping process.

FIG. 6 illustrates a graphical user interface (GUI) 602 that is generated and displayed before starting an area mapping process, according to some examples. Similar to the GUI 102, the GUI 602 may present a real-time camera view and various visual representations. The visual representations may include an instruction about performing an area mapping process, such as "[m]ap your landmarker's areas by pointing your phone at it from the same locations you expect people to be when using the lens. Cover as many angles as possible." In some examples, the GUI 602 may include a virtual button 604 to begin the area mapping process. When a user presses the button 604, the area mapping process begins and the GUI 702 in FIG. 7 is displayed.

Figure 7:
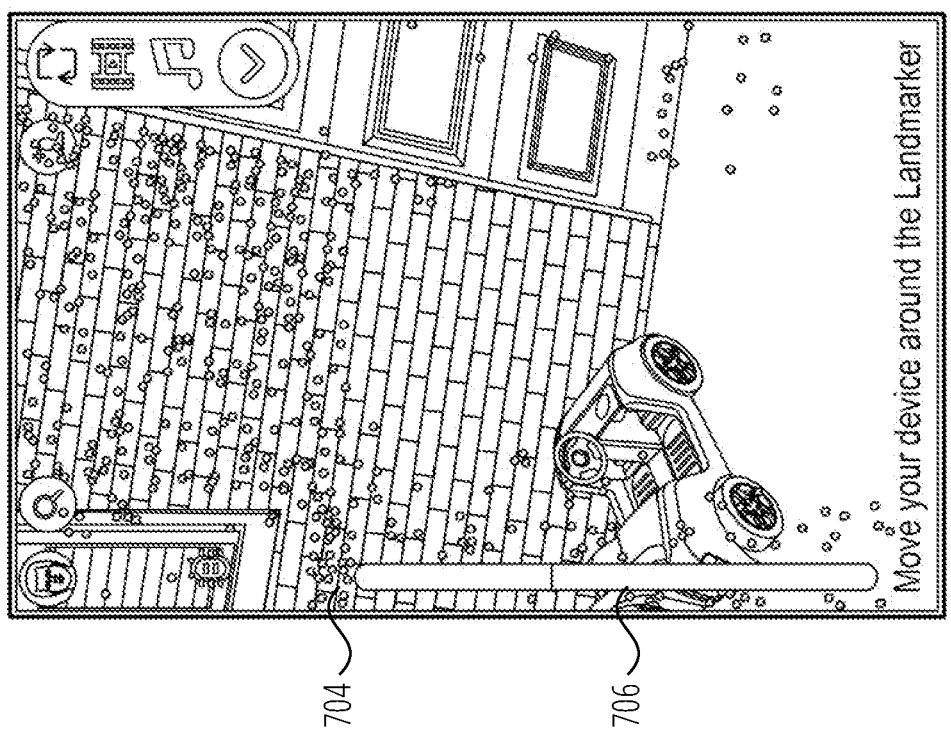
FIG. 7 illustrates a graphical user interface during an area mapping process, according to some examples.

FIG. 7 illustrates a graphical user interface 702 during an area mapping process, according to some examples. As shown in FIG. 7, the GUI 702 presents a real-time camera view and multiple sparse points 704 superimposed on a reference surface of a reference object (e.g., walls, windows, doors, cars) in the real-time camera view. The sparse points 704 are automatically generated when a user moves the camera of the user device across the reference surface. Specifically, the sparse points 704 may be generated and/or updated whenever the user moves the camera for more than a preset distance, such as, one centimeter, two centimeters, five centimeters, ten centimeters, one inch, two inches, five inches, or the like. A user may locate the user device to locations where they expect other people would stand when visiting the reference object to perform below-described operations and processes from such vantage points. In some examples, the sparse points 704 are generated simultaneously when the 3D meshes 304 in FIG. 3 are generated.

In some examples, the GUI 702 may include a visual representation (e.g., a bar 706) that shows a number or count of sparse points are generated during the area mapping process. The visual representation may also show a minimum and/or a maximum number of sparse points. In some examples, when a count of sparse points 704 exceeds the maximum number, the "old" (e.g., earlier captured) sparse points are at least partially replaced by "new" (e.g., later captured) sparse points. In some examples, when a count of sparse points 704 exceeds the maximum number, the area mapping process may terminate. A user may also press a virtual button on GUI 702 (not shown in the figure) to manually terminate the area mapping process if they feel the sparse points are sufficient for a location tracking data representation. When the area mapping process is terminated, the GUI 802 in FIG. 8 is displayed.

Figure 8:
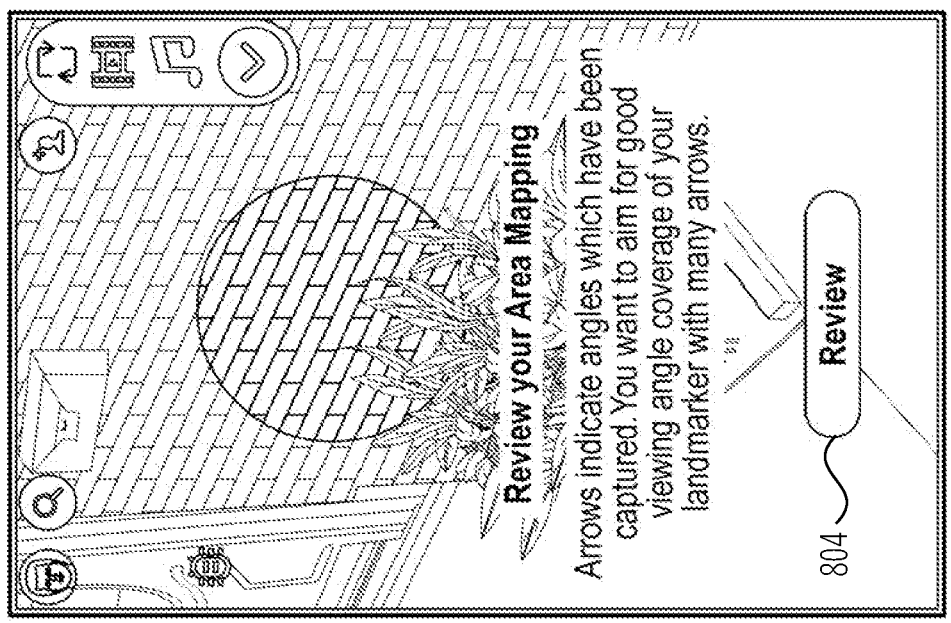
FIG. 8 illustrates a graphical user interface after an area mapping process, according to some examples.
Figure 10:
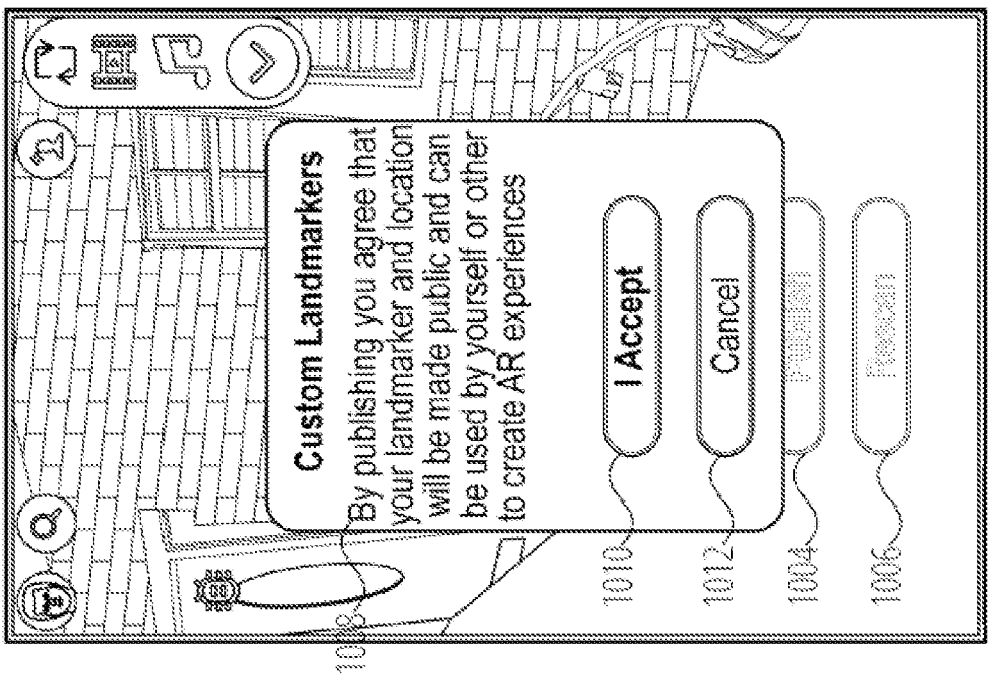
FIG. 10 illustrates a graphical user interface presented after completing a 3D mapping process and an area mapping process, according to some examples.
Figure 9:
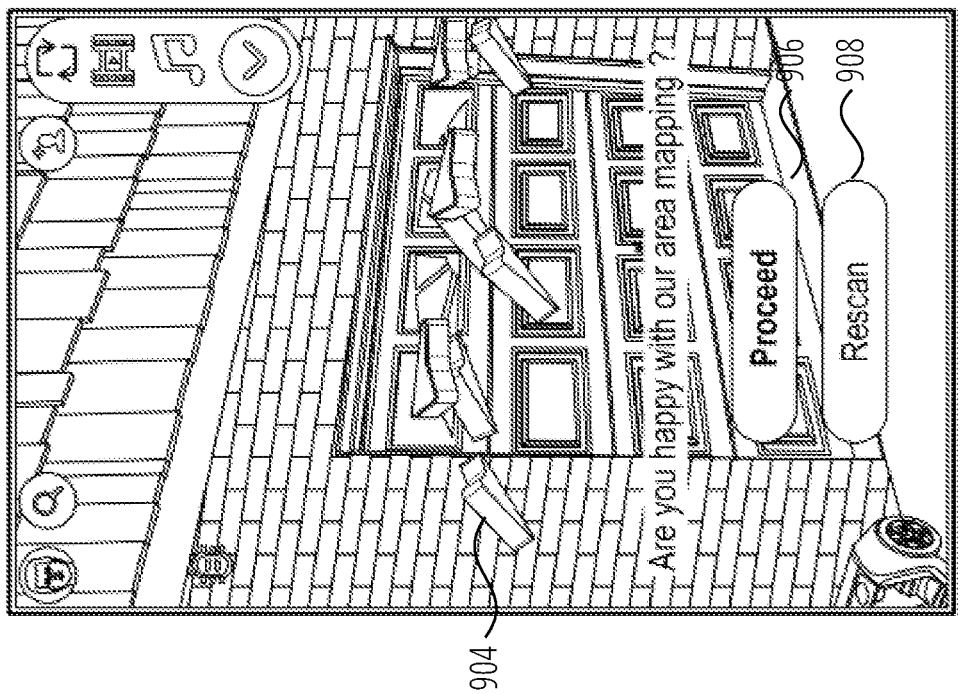
FIG. 9 illustrates a graphical user interface to facilitate reviewing an area mapping process, according to some examples.

FIG. 8 illustrates a graphical user interface (GUI) 802 after an area mapping process, according to some examples. The GUI 802 may be shown after an area mapping process is finished. The GUI 802 may present a real-time camera view and various visual representations. The visual representations may include an instruction on how a result of area mapping process can be reviewed, such as "[a]rrows indicate angles which have been captured. You want to aim for good viewing angle coverage of your landmarker with many arrows." The visual representations may also include a virtual button 804. When a user presses the button 804, a reviewing process begins and GUI 902 in FIG. 9 is displayed. In some examples, the GUI 802 may also include a virtual button (not shown in figure) to skip the reviewing process. If a user presses the button to skip the reviewing process, the GUI 1002 in FIG. 10 is displayed.

FIG. 9 illustrates a graphical user interface (GUI) 902 to facilitate reviewing an area mapping process, according to some examples. As shown in FIG. 9, the GUI 902 may present a real-time camera view, and one or more arrows 904 superimposed on the real-time view. The arrows 904 correspond to a perspective (e.g., a keyframe or a frame) of a selected camera of the user device. Specifically, the perspective may correspond to a position and an orientation (collectively referred to as a pose) of the camera when the sparse points are generated in the area mapping process. In some examples, the position and orientation of the camera may be determined by a SLAM tracking model using computer vision technology. Additionally, or alternatively, the position and orientation of the camera may be determined by a gyroscope installed on the camera or installed on a same device as which the camera is installed on. Besides the arrows, the perspective may be represented in any 2D or 3D shapes, such as, circles, rectangles, spheres, cubes, or the like, or any combinations thereof. The GUI 902 may also include the sparse points 704 generated in the GUI 702. The arrows 904 may be associated with a set of the sparse points 704.

The GUI 902 may further present a question about area mapping such as "[a]re you happy with our area mapping?" and two virtual buttons 906 and 908 that correspond to "proceed" and "rescan," respectively. When a user presses the button 906, a location tracking data representation (e.g., SLAM model, Computer Vision model, 3D sparse map) is automatically generated based on the mapped areas and the generated sparse points. Then the GUI 1002 in FIG. 10 is displayed. When a user presses the button 908, GUI 702 in FIG. 7 is displayed and the area mapping process is reperformed.

In some examples, GUIs 802 and 902 may not be shown. In other words, the location tracking date representation may be directly generated without requiring the user to review the result of the area mapping process.

In some examples, an alignment process is performed after the 3D mapping process and area mapping process are finished to ensure that the location tracking data representation is aligned with the 3D data representation. Detailed descriptions regarding the alignment may be found elsewhere in the present disclosure. See, e.g., operation 1806 of method 1800 in FIG. 18.

Figure 11:
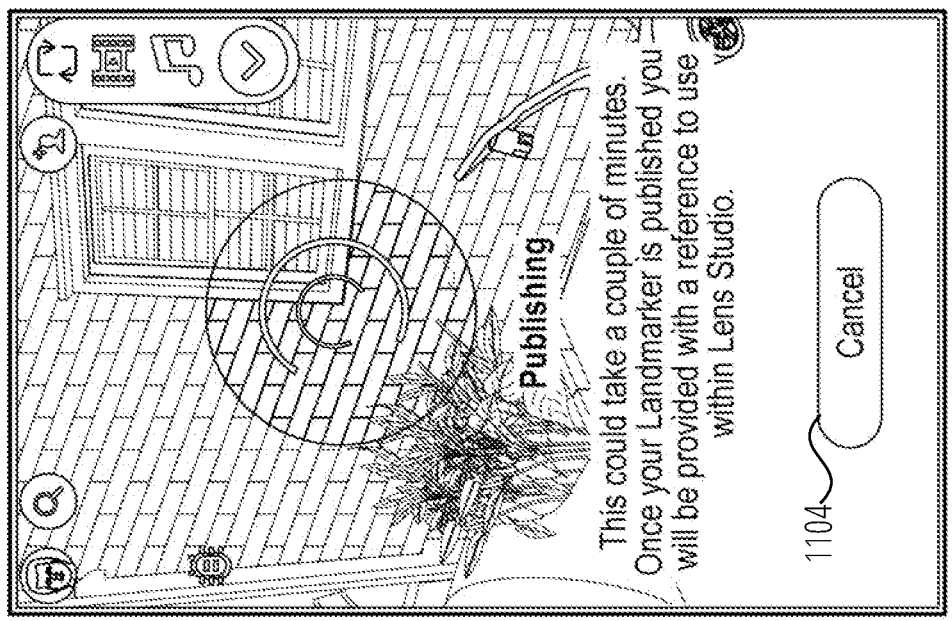
FIG. 11 illustrates a graphical user interface presented during publication of a custom AR landmarker or location, according to some examples.

FIG. 10 is a graphical user interface diagram showing a graphical user interface (GUI) 1002 that is presented after completing a 3D mapping process and an area mapping process, according to some examples. As shown in FIG. 10, the interface 1002 includes two virtual buttons 1004 and 1006, which corresponds to "publish" and "rescan," respectively. "Publish" used herein means uploading a content to a public database such that other users may view and/or download the uploaded content. When a user presses the button 1004, a publishing process is entered and a disclaimer 1008 and two virtual buttons 1010 and 1012 are shown. When a user presses the button 1006, either GUI 302 in FIG. 3 or GUI 702 in FIG. 7 is displayed and either or both of the 3D mapping process and the area mapping process may be reperformed. The disclaimer 1008 for publication may recite "[b]y publishing you agree that your landmarker and location will be made public and can be used by yourself or other to create AR experiences for Online chat within Lens Studio," however, it's not limiting. The two visual buttons 1004 and 1006 may correspond to an acceptance of the disclaimer or a rejection of the disclaimer, respectively. When a user presses the button 1004, the GUI 1102 in FIG. 11 is displayed. When a user presses the button 1012, the GUI 902 in FIG. 9 is displayed.

In some examples, both the 3D data representation and the location tracking data representation are published. Additionally, or alternatively, a 3D model (e.g., a custom AR landmarker/location) is generated and published based on the 3D data representation and the location tracking data representation.

FIG. 11 illustrates a graphical user interface (GUI) 1102 that is presented during publication of a custom AR landmarker or location, according to some examples. As shown in FIG. 11, the GUI 1102 provides a button 1104 to cancel the publication. A user may press the button 1104 any time during the publication to cancel it. When the user presses the button 1104, the GUI 1002 in FIG. 10 is displayed.

Figure 12:
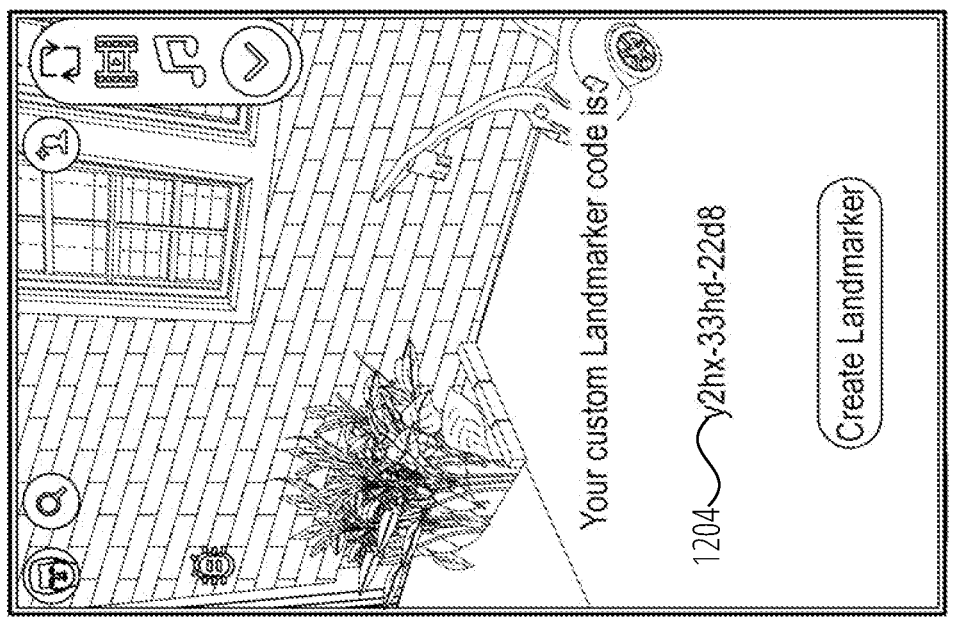
FIG. 12 illustrates a graphical user interface presented after publishing a custom AR landmarker or location, according to some examples.

FIG. 12 illustrates a graphical user interface (GUI) 1202 that is presented after publishing a custom AR landmarker or location, according to some examples. As shown in FIG. 12, the GUI 1202 may include a visual representation 1204 corresponding to a code of the published custom AR landmarker or location, namely "y2hx-33hd-22d8." In some examples, the code is unique for each AR landmarker or location. Alternatively, the code may be unique for each user. The user may also customize the code according to a predetermined rule.

Figure 13:
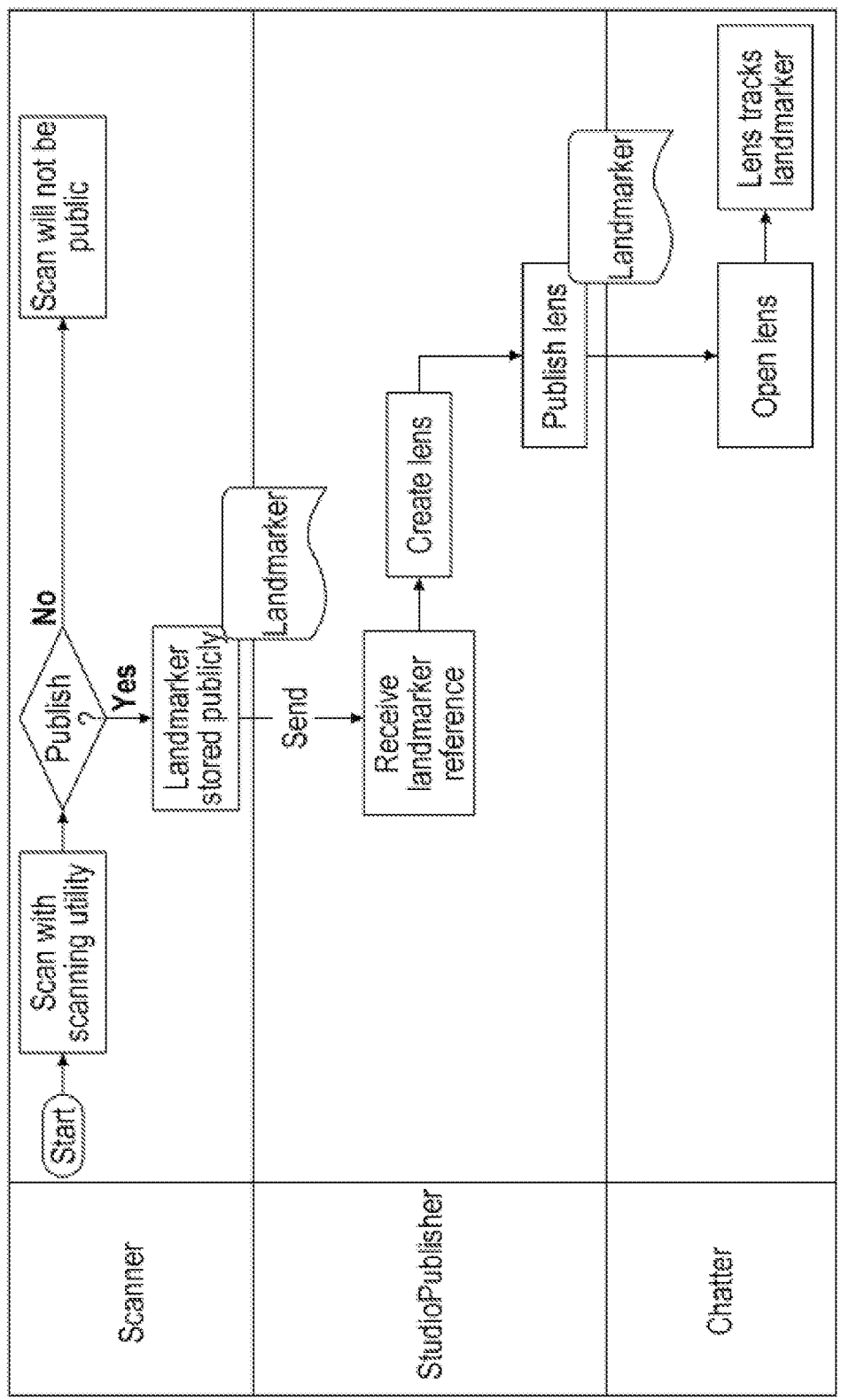
FIG. 13 is a swim lane flowchart illustrating the various operations according to some examples.

FIG. 13 is a swim lane flowchart illustrating the various operations performed by users having access to the following utilities, functions, or applications:

A scanner application having a scanning function (e.g., a scanning utility included in an application 1906)

An augmentation publication application; and

An augmentation creation application (e.g., an augmentation creation utility included in an application 1906).

Users may act in one or more roles in the examples described herein:

A Scanner 1302 uses their device on-site to ingest features+meshes.

StudioPublisher 1304 is an augmentation (e.g., lens) publisher with access to an augmentation (e.g., lens) creation applications (e.g., studio 1404) and public Online chat.

An InternalPublisher is a subset of StudioPublisher with access to internal Studio, BBG, and alpha Online chat+tweaks+logs.

An Online chatter 1306 is a Member of Public with access to an application 1906 on a mobile device.

An InternalProcess is an internal team or process wishing to understand the usage of product and totality of ingested features+meshes, potentially to improve them and other products.

A Moderator is a member of an internal team responsible for assessing the appropriateness of a lens using a Landmarker, or responding to an external feedback regarding a specific lens.

Some data terms used in connection with describing examples herein include:

A 3D reference model (e.g., referred to an AR landmarker or location, in some examples described herein) is information relevant to an augmentation (e.g., a lens) running or intended to run at a specific location. Includes features for device localization to a well-defined frame and a mesh (e.g., an OBJ file) and/or sparse map to assist AR interaction. These may, in some examples, also be referred to user-generated AR landmarkers or locations. A mesh may be produced using LIDAR or monocular depth.

3D reference models may be stored in the cloud during the generation process. A 3D model reference (e.g., referred to as a LandmarkID in some examples described herein) is a reference that can later be used by the Scanner user to download a 3D reference model as a file, or supplied to a creation application publisher to similarly use the 3D reference model. The 3D remodel reference may be a download URL, or a QR Code/machine-readable code wrapping a download URL, or an identifying code.

A GeoObject is spatially indexed and queryable data.

Example Components

Some components of examples described herein include:

An object scanning utility or component (referred to as ScanUtility, in some examples) is a utility running on-device, either in-augmentation, in-app, or separate- App. It is used by Scanner to obtain features (e.g., as a sparse map) used for localization, and meshes via LIDAR or computer vision techniques. The ScanUtility includes a "Test mode" where the user gets to load up and inspect their scanned Landmarkers. Users will be encouraged to use this "Test mode" before attempting to publish their scanned Landmarkers.

Cloud content storage (referred to as BOLT, in some examples). Assets saved via collection: key pair in ONLINE_TOKEN authenticated sessions, returning a URL for that asset. URL can then be used to retrieve the asset. Assets are blobs, which may have been encrypted by the client.

Backend service that serves as a spatial index (referred to as GeoStorage, in some examples). Can be used to create a spatially queryable directory of assets in BOLT. Authentication is by CANVAS_TOKEN, which in turn is obtained from ONLINE_TOKEN authenticated user. CANVAS_TOKEN in turn implies objects in GeoStorage has read/write permissions determined by the asset creator, and is individually one of user, session or global in nature.

Lens Preview is an augmentation running on a simulated device within Lens Studio A messaging application (referred to as Online chat App, in some examples) running on a user's device with access to their online account and services mentioned herein.

A user's online account (referred to as Online chat Account, in some examples), the aggregates of information stored by the user accessible either on device or in web browser.

Example Operations

Scanner runs ScanUtility on a LIDAR-enabled device on-site to ingest features+mesh. The scanned metadata+features+mesh forms the information required for a 3D reference model asset. This utility is discoverable through a machine-readable code embedded in a web page that describes this feature. The approximate area of applicability of the scan is a 10 m×10 m×5 m region.

Scanner chooses to publish a scanned 3D reference model, which would make it available for use in augmentation development by a StudioPublisher who has its 3D reference model reference or identifier, as well as any user using the resulting augmentation (e.g., lens).

When a Scanner publishes a 3D reference model, they are provided with a 3D reference model reference in a form suitable for sharing them with a StudioPublisher user, either as a binary asset, shareable URL requiring Online user authentication, or QR code/Machine-readable code wrapping either of these.

StudioPublisher uses a 3D reference model reference provided by a Scanner user to add a 3D reference model to an augmentation creation application project as an asset.

StudioPublisher uses the mesh associated with the 3D reference model for augmentation preview in Studio.

StudioPublisher publishes an augmentation for the 3D reference model, and the 3D reference model assets is available inaugmentation to anyone with access to that augmentation.

ExternalUser uses an augmentation embedding the 3D reference model asset on a potentially non-LIDAR enabled device for tracking on-site.

An ExternalUser determines that an augmentation or publicly available 3D reference model id may reference a 3D reference model created embodying restricted or illegal content. A Moderator is able to takedown both the augmentation referencing the 3D reference model, and the 3D reference model itself from servers such that it can no longer be externally downloaded or used in an augmentation.

Scanner has a visualization of features and mesh that will form the 3D reference model. Scanner app visualizes the size of the supported area and gives an indication of where people can stand within this area and localize. Scanner app provides the Scanner user with feedback as to how well their scanned 3D reference model can be expected to work.

A user who is both a Scanner and a StudioPublisher pulls a 3D reference model from a private list of their own 3D reference models obtained in Studio.

Scanner can review their published 3D reference models for the purposes of deleting them or providing their 3D reference model Reference to other users.

Prior to publishing, a Scanner can re-open a scanning session to improve the quality of the 3D reference model, for example, during night conditions.

The 3D reference model asset may, in some examples, not be embedded as a binary within the augmentation.

Moderator users can retrieve 3D reference model IDs off published augmentation from BBG.

A Moderator can assess an augmentation using a 3D reference model for appropriateness, even if they are not at the location where the 3D reference model would actively be tracked. During moderation, it is possible to simulate localizing against the 3D reference model(s) it uses.

If a particular 3D reference model is being taken down, a Moderator is able to retrieve a list of all augmentation using that 3D reference model so the augmentation can be taken down and their authors notified, or the authors can be instructed their augmentation need to be re-published with new 3D reference models to continue working properly.

To understand and improve processes, an InternalProcess user needs metrics on user engagement. Time spent downloading in User augmentations and filtering engagement statistics by augmentations using user-generated 3D reference models.

StudioPublisher is able to use multiple landmarks by programmatically enabling in .js a location-using branch of the scene graph depending upon user location.

InternalProcess users receive 3D reference model creation metrics, including size, quality, timing, and performance. These can be divided between the creation of maps and meshes, and time spent uploading. To understand hotspots of usage, geoinformation, and time-of-day information could be accumulated on landmarks prior to publishing.

Figure 14:
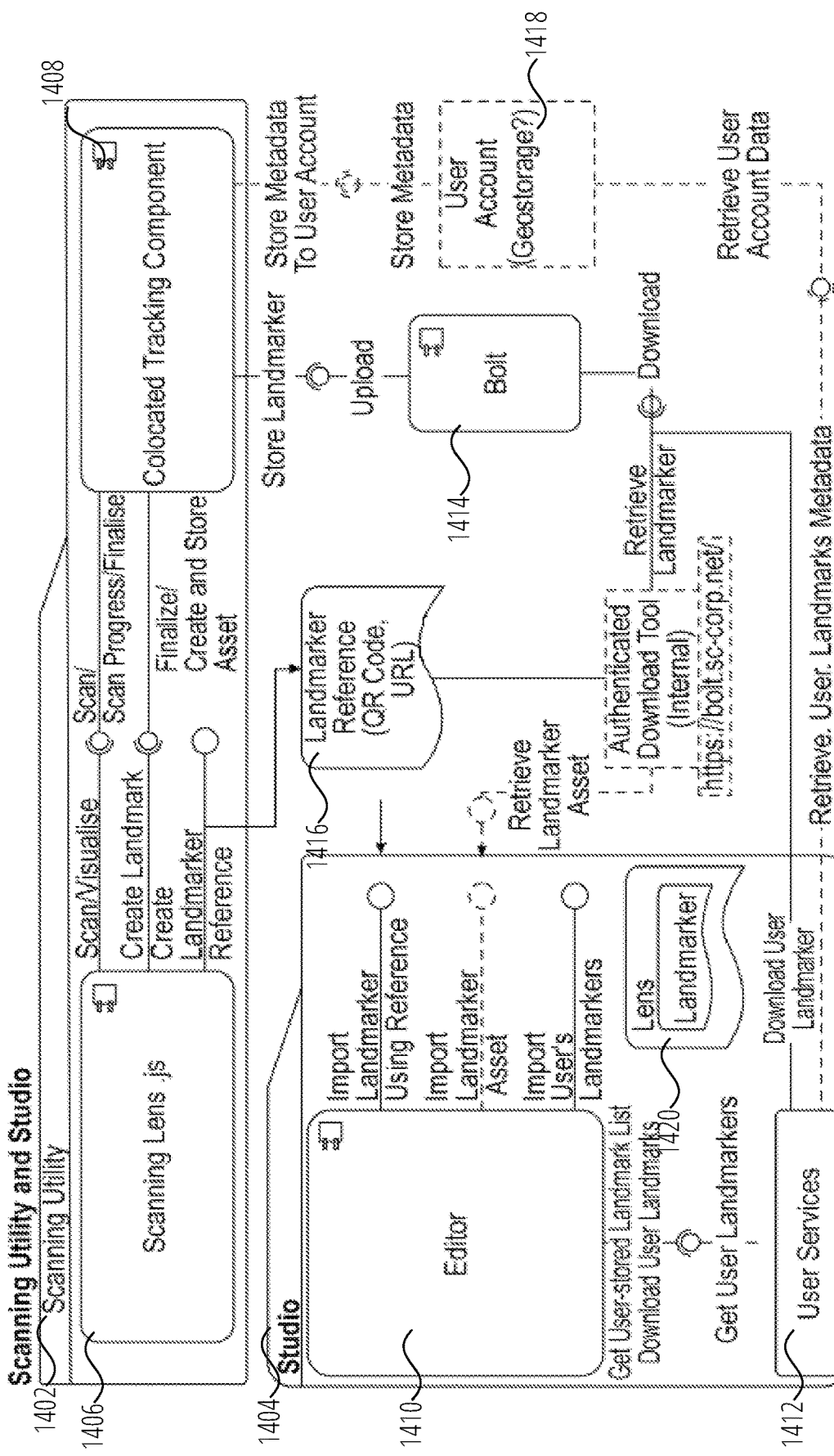
FIG. 14 is a block diagram showing the various component interactions for components of a scanning utility and components of an augmentation creation application according to some examples.

FIG. 14 is a block diagram showing the various component interactions for components of a scanning utility 1402 (e.g., which is included as an augmentation creation system 2008 within the application 1906), and components of an augmentation creation application (e.g., example referenced as a studio application 1404), according to some examples. As shown in FIG. 14, the scanning utility 1402 includes a scanning lens 1406 and a colocated tracking component 1408. The scanning utility 1402 may be a scanner application having a scanning function.

The studio application 1404 includes an editor 1410, a lens 1420, and user services 1412. In some examples, the scanning lens 1406 detects an AR landmarker/location reference 1416 (e.g., a QR code, an identifier, a URL). The editor 1410 imports an AR landmarker/location asset using the AR landmarker/location reference. Specifically, an AR landmarker/location asset may first be downloaded through an authenticated download tool 1414 (e.g., https://bolt.sc-corp.net/). Then the user services 1412 download a user AR landmarker/location using the download tool 1414 and retrieves user landmarks metadata from a storage 1418 that stores metadata. The studio application 1404 may login to the storage 1418 to get customized metadata for a specific user account (e.g., an Online Account, a Geostorage).

In some examples, the AR landmarker/location and the user AR landmarker/location metadata are generated by the colocated tracking component 1408. Specifically, a JavaScript API may be added to the colocated tracking component 1408 to allow the user to control the creation of landmark map. A user may be enabled to incrementally build a collocated map by facilitating the building of a map on top of an existing one. This is performed as follows: creating a session and scanning a collocated map; rejoining the session at a later time e.g., under different lighting conditions), and wait for the on Found event to fire, ensuring that any newly scanned data is aligned with the existing one; and call startBuilding again, which will augment the existing map with the newly captured data.

Figure 15:
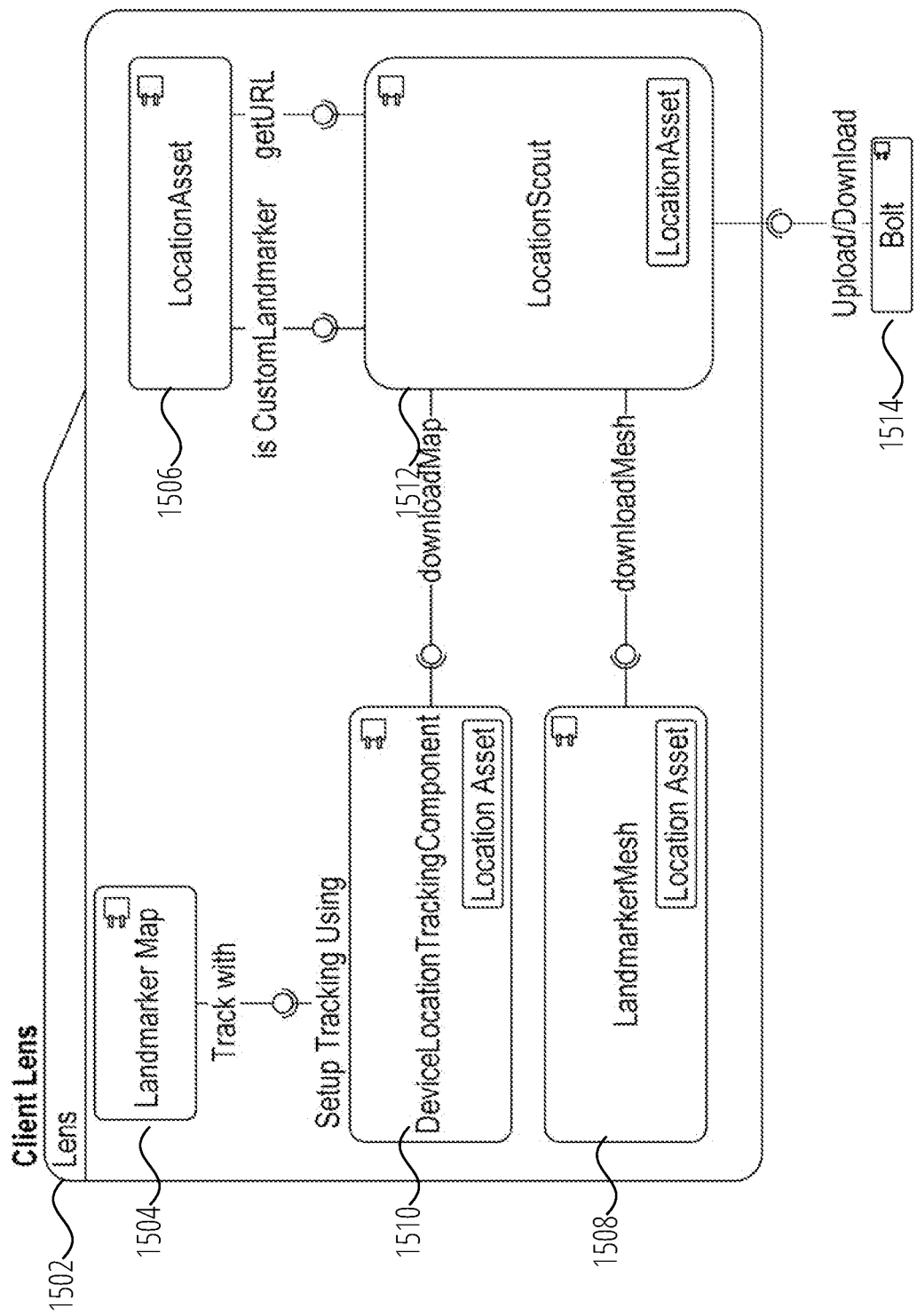
FIG. 15 is a block diagram showing various component interactions of an augmentation creation utility according to some examples.

FIG. 15 is a block diagram showing various component interactions of an augmentation creation utility (e.g., which is included in an augmentation system 2006 within the application 1906 and is referenced as "lens"), according to some examples.

As shown in FIG. 15, the lens 1502 may include an AR landmarker/location map 1504, a location asset 1506, a device location tracking component 1510, an AR landmarker/location mesh 1508, and a location scout 1512. In some examples, the AR landmarker/location map 1504 is tracked by the device location tracking component 1510. When a URL is detected, and a custom AR landmarker/location is found, the location scout 1512 receives data from location asset 1506. The device location tracking component 1510 downloads 3D sparse map from the location scout 1512. The AR landmarker/location mesh 1508 downloads mesh from the location scout 1512. The location scout 1512 uploads data to or download data from a bolt 1514.

Figure 16:
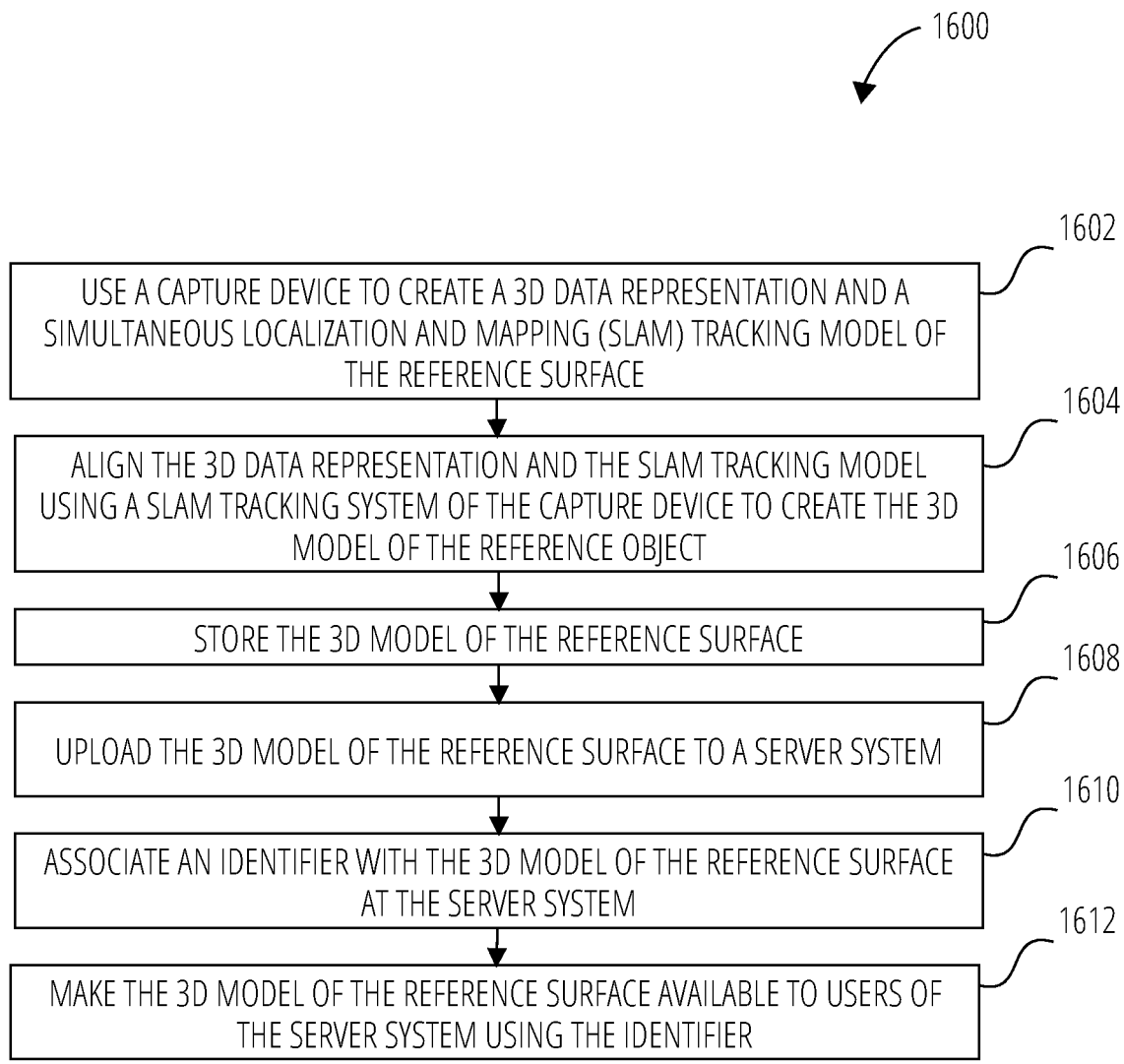
FIG. 16 is a flowchart illustrating a method to generate and share a three-dimensional (3D) model of a reference surface, according to some examples.

FIG. 16 is a flowchart illustrating a method 1600 to generate and share a three-dimensional (3D) model of a reference surface, according to some examples. The method 1600 is, in some examples, performed by a creation application, such as the scanning utility 1402 and the studio application 1404, described herein.

In operation 1602, a creator user deploys the scanning application 1402, hosted on a hosted on a capture device, to create a 3D data representation and a Simultaneous Localization And Mapping (SLAM) tracking model (e.g., a CV model, a 3D sparse map) of a reference surface.

In operation 1604, the scanning utility 1402 (e.g., colocated tracking component 1408) aligns the 3D data representation and the SLAM tracking model using a SLAM tracking system of the capture device to create the 3D model of the reference object. In operation 1606, the scanning utility 1402 (e.g., storage 1418) stores the 3D model of the reference surface.

In operation 1608, the scanning utility 1402 uploads the 3D model of the reference surface to a server system (e.g., the interaction server system 1098). In operation 1610, the scanning utility 1402 (e.g., scanning lens 1406) associates an identifier (also referred to as a code) with the 3D model of the reference surface at the server system. In operation 1612, the scanning utility 1402 makes the 3D model of the reference surface available to users of the server system using the identifier.

The method 1600 may also include augmenting the 3D model with augmentations to create augmented image data superimposed on the reference surface as an augmented reality superimposition. In some examples, the operation 1612 enables a user, same as or different from the user who publishes the 3D model, to download the 3D model, either solely, or with the augmented reality superimposition by entering the identifier.

Further details regarding method 1600, according to some examples, are provided below.

Figure 17:
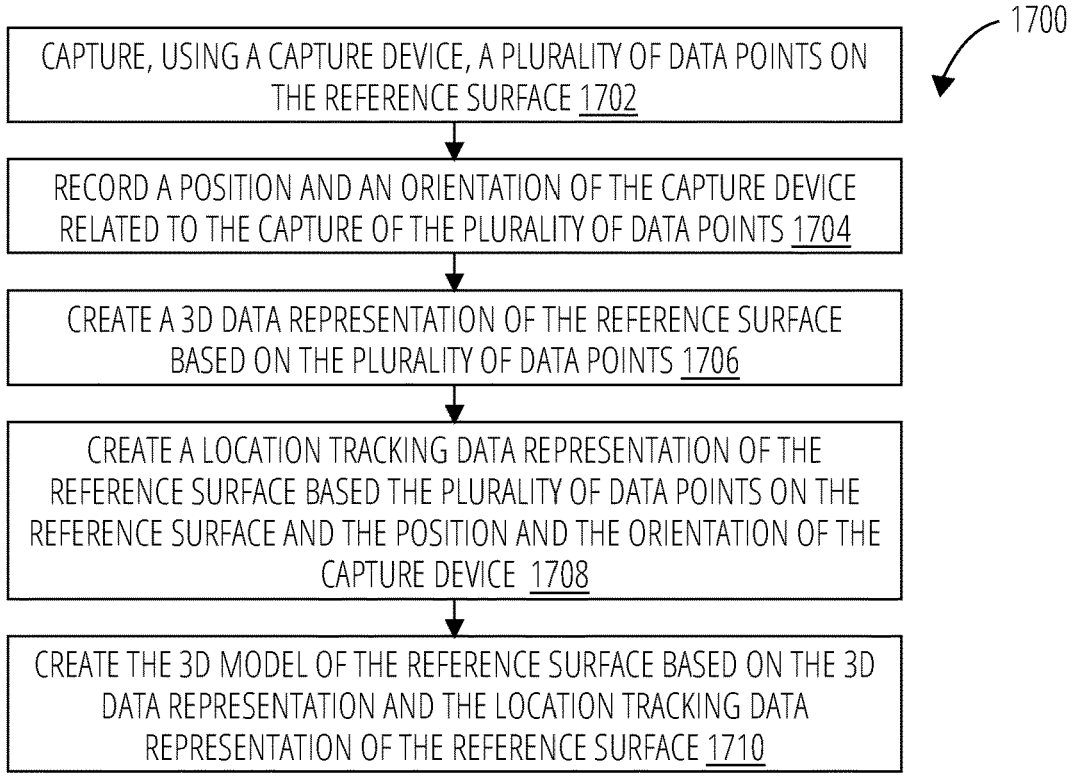
FIG. 17 is a flowchart illustrating a method to create a three-dimensional (3D) model of a reference surface, according to some examples.

FIG. 17 is a flowchart illustrating a method 1700 to create a three-dimensional (3D) model of a reference surface, according to some examples. The method 1700 is, in some examples, performed by a creation application, such as the scanning utility 1402 and the studio application 1404, described herein.

In operation 1702, the scanning utility 1402 captures, using a capture device, multiple data points on the reference surface. In some examples, the capture device includes a visible light camera, a LIDAR camera, and/or an infrared camera. The captured data points are displayed on a display of a user device as sparse points (e.g., sparse points 704 of GUI 702 in FIG. 7). The operation 1702 also includes acquiring information associated with the data points. The information includes colors, grayscales, and/or positions of the data points. When a LIDAR camera is used, the information may also include depths of the data points.

In operation 1704, the scanning utility 1402 determines a position and an orientation of the capture device related to the capture of the multiple data points. The position and orientation of the camera may be determined by a SLAM tracking model using computer vision technology. Additionally, or alternatively, the position and orientation of the camera may be determined by a gyroscope installed on the camera or installed on the same device on which the camera is installed.

In operation 1706, the scanning utility 1402 creates a 3D data representation of the reference surface based on the plurality of data points. The 3D data representation may be a 3D mesh. Example 3D data representation may be found in FIG. 3 as 3D meshes 304. In some examples, the scanning utility 1402 uses a capture device to capture data under a plurality of lighting conditions and amalgamates the capture data to create the 3D data representation.

In operation 1708, the scanning utility 1402 creates a location tracking data representation of the reference surface based the multiple data points on the reference surface and the position and the orientation of the capture device. In some examples, the position and orientation of the capture device may collectively correspond to a frame (e.g., a 2D plane) of the capture device. The method 1700 may associate a set of data points with the frame and determine the location tracking data representation based on the frames with associated data points. Merely by way of example, the location tracking data representation is a 3D sparse map, which includes multiple sets of 2D sparse points with their associated frames. In some examples, the same data points are used for both operation 1706 and operation 1708. Alternatively, different data points are captured in operation 1702 for operation 1706 and operation 1708, separately.

In operation 1710, the scanning utility 1402 creates the 3D model of the reference surface based on the 3D data representation and the location tracking data representation of the reference surface. In some examples, the 3D data representation includes the shape and structure of the reference surface, but it may not include any location tracking information about what portion of the reference surface can be seen by a user when the user stands at a particular position and orientation. The location tracking data representation, on the other hand, may not have very detailed and accurate information about the shape and structure of the reference surface, but includes detailed location-tracking information.

The method 1700 combines the 3D data representation and the location-tracking data representation to generate a 3D model which has not only accurate and detailed shape and structure information, but also location-tracking information. In some examples, a first user augments the 3D model with augmentations to create augmented image data superimposed on the reference surface as an augmented reality superimposition. A second user downloads the augmented 3D model. Even if the second user uses the augmented 3D model at a new location slightly removed from where the original data points are captured, the 3D model is able to generate the AR superimposition at the new location, as a result from the detailed shape/structure information and location tracking information contained in the 3D model.

Figure 18:
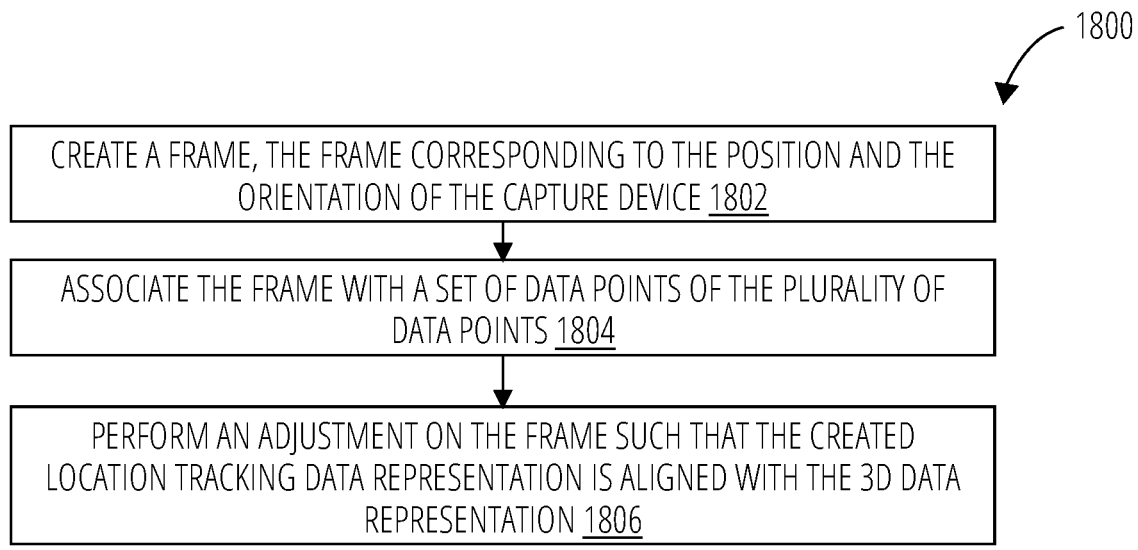
FIG. 18 is a flowchart illustrating a method to align a 3D data representation with a location tracking data representation, according to some examples.

FIG. 18 is a flowchart illustrating a method 1800 to align a 3D data representation with a location tracking data representation, according to some examples. The method 1800 is, in some examples, performed by a creation application, such as the scanning utility 1402 and the studio application 1404, described herein.

In operation 1802, the scanning utility 1402 creates a frame, the frame corresponding to a posture (e.g., a position and/or an orientation) of the capture device (e.g., the client system 1902). In some examples, multiple positions and orientations of the capture devices are determined, and multiple frames are created. The frame is a 2D plane that faces a certain portion of the reference surface.

In operation 1804, the scanning utility 1402 associates the frame with a set of data points of the plurality of data points. In some examples, the set of data points comprises data points on the reference surface that may be visible to the frame. The set of data points may be in a same 2D plane. If multiple frames are created in operation 1802, each frame is associated with a separate set of data points. The same data point is associated with multiple frames.

In operation 1806, the scanning utility 1402 performs an adjustment on the frame such that the created location tracking data representation is aligned with the 3D data representation. For example, the alignment includes adjusting the position of the frame according to an original position of the capture device and adjusting the orientation of the frame according to the gravitational direction information of the capture device. Specifically, the gravitational direction of the capture device may be perpendicular to the capture direction (orientation) of the capture device and aligned with the perspectives of the location tracking data representation. The alignment of gravitational direction can help align the orientation in the 3D data representation with the orientation in the location tracking data representation better. Also, a user usually keeps the capture device essentially upright when he/she uses the generated custom landmarker in the present disclosure. The alignment of gravitation direction can make the augmentation more accurate.

It should be noted that these examples shall not be limiting. Other adjustments may be performed on the frame to align the location tracking data representation with the 3D data representation. In some examples, if multiple frames are created in operation 1802, only a first frame is aligned with the 3D data representation. Alternatively, all the frames created are aligned with the 3D data representation.

Networked Computing Environment

Figure 19:
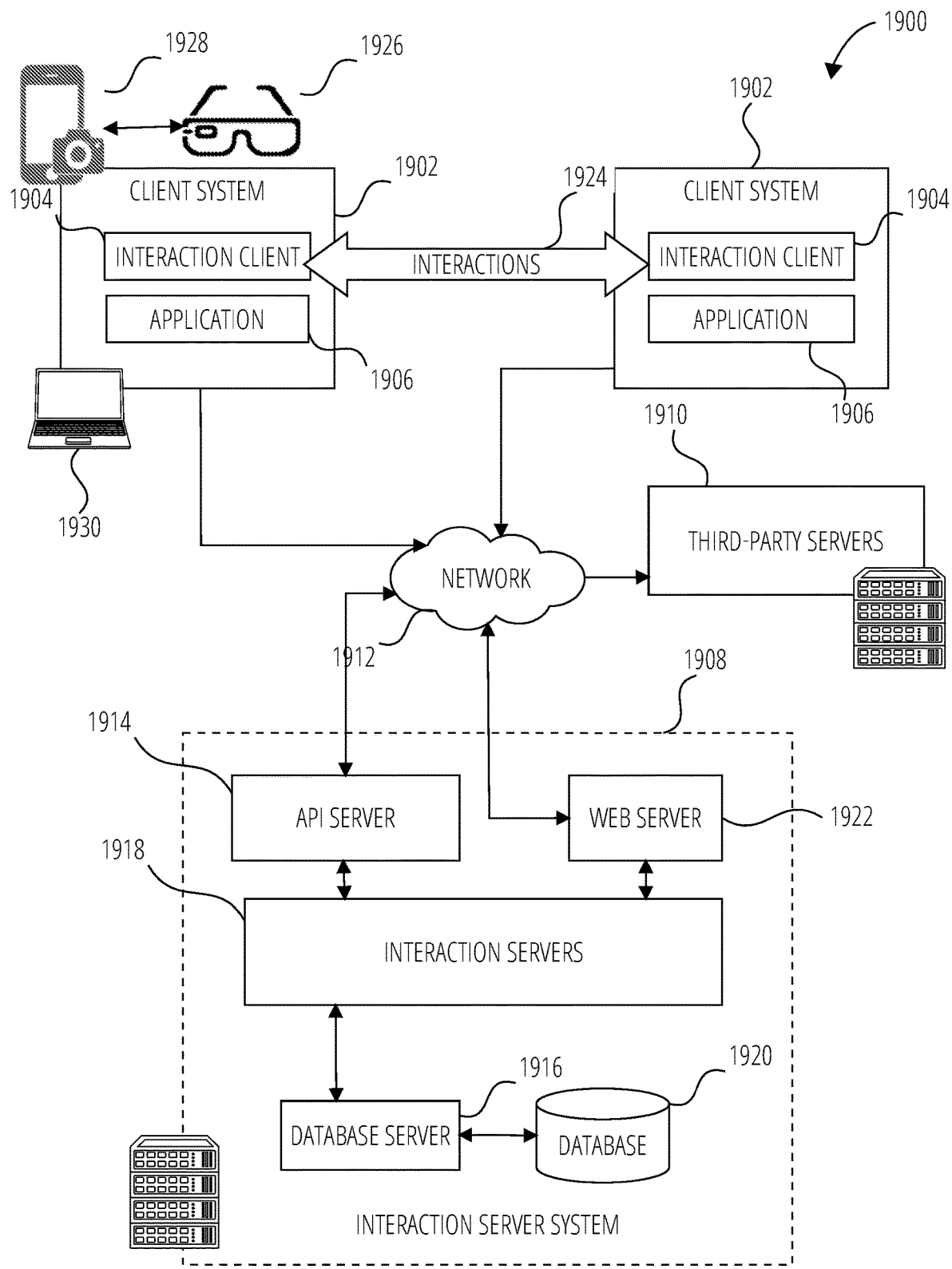
FIG. 19 is a diagrammatic representation of a networked environment in which the present disclosure may be deployed, according to some examples.

FIG. 19 is a block diagram showing an example interaction system 1900 for facilitating interactions (e.g., exchanging text messages, conducting text audio and video calls, or playing games) over a network. The interaction system 1900 includes multiple client systems 1902, each of which hosts multiple applications, including an interaction client 1904 and other applications 1906. Each interaction client 1904 is communicatively coupled, via one or more communication networks including a network 1912 (e.g., the Internet), to other instances of the interaction client 1904 (e.g., hosted on respective other client systems 1902), an interaction server system 1908 and third-party servers 1910). An interaction client 1904 can also communicate with locally hosted applications 1906 using Applications Program Interfaces (APIs).

An interaction client 1904 interacts with other interaction clients 1904 and with the interaction server system 1908 via the network 1912. The data exchanged between the interaction clients 1904 (e.g., interactions 1924) and between the interaction clients 1904 and the interaction server system 1908 includes functions (e.g., commands to invoke functions) and payload data (e.g., text, audio, video, or other multimedia data).

The interaction server system 1908 provides server-side functionality via the network 1912 to the interaction clients 1904. While certain functions of the interaction system 1900 are described herein as being performed by either an interaction client 1904 or by the interaction server system 1908, the location of certain functionality either within the interaction client 1904 or the interaction server system 1908 may be a design choice. For example, it may be technically preferable to initially deploy particular technology and functionality within the interaction server system 1908 but to later migrate this technology and functionality to the interaction client 1904 where a client system 1902 has sufficient processing capacity.

The interaction server system 1908 supports various services and operations that are provided to the interaction clients 1904. Such operations include transmitting data to, receiving data from, and processing data generated by the interaction clients 1904. This data may include message content, client device information, geolocation information, media augmentation and overlays, message content persistence conditions, social network information, and live event information. Data exchanges within the interaction system 1900 are invoked and controlled through functions available via user interfaces (UIs) of the interaction clients 1904.

Turning now specifically to the interaction server system 1908, an Application Program Interface (API) server 1914 is coupled to and provides programmatic interfaces to interaction servers 1918, making the functions of the interaction servers 1918 accessible to interaction clients 1904, other applications 1906 and third-party servers 1910. The interaction servers 1918 are communicatively coupled to a database server 1916, facilitating access to a database 1920 that stores data associated with interactions processed by the interaction servers 1918. Similarly, a web server 1922 is coupled to the interaction servers 1918 and provides web-based interfaces to the interaction servers 1918. To this end, the web server 1922 processes incoming network requests over the Hypertext Transfer Protocol (HTTP) and several other related protocols.

The Application Program Interface (API) server 1914 receives and transmits interaction data (e.g., commands and message payloads) between the interaction servers 1918, and the client systems 1902 (and for example interaction clients 1904 and other application 1906) and the third-party servers 1910. Specifically, the Application Program Interface (API) server 1914 provides a set of interfaces (e.g., routines and protocols) that can be called or queried by the interaction client 1904 and other applications 1906 to invoke functionality of the interaction servers 1918. The Application Program Interface (API) server 1914 exposes various functions supported by the interaction servers 1918, including account registration, login functionality, the sending of interaction data via the interaction servers 1918, from a particular interaction client 1904 to another interaction client 1904, the communication of media files (e.g., images or video) from an interaction client 1904 to the interaction servers 1918, the settings of a collection of media data (e.g., a story), the retrieval of a list of friends of a user of a client system 1902, the retrieval of messages and content, the addition and deletion of entities (e.g., friends) to an entity graph (e.g., a social graph), the location of friends within a social graph, and opening an application event (e.g., relating to the interaction client 1904).

The interaction servers 1918 host multiple systems and subsystems, described below with reference to FIG. 20.

System Architecture

Figure 20:
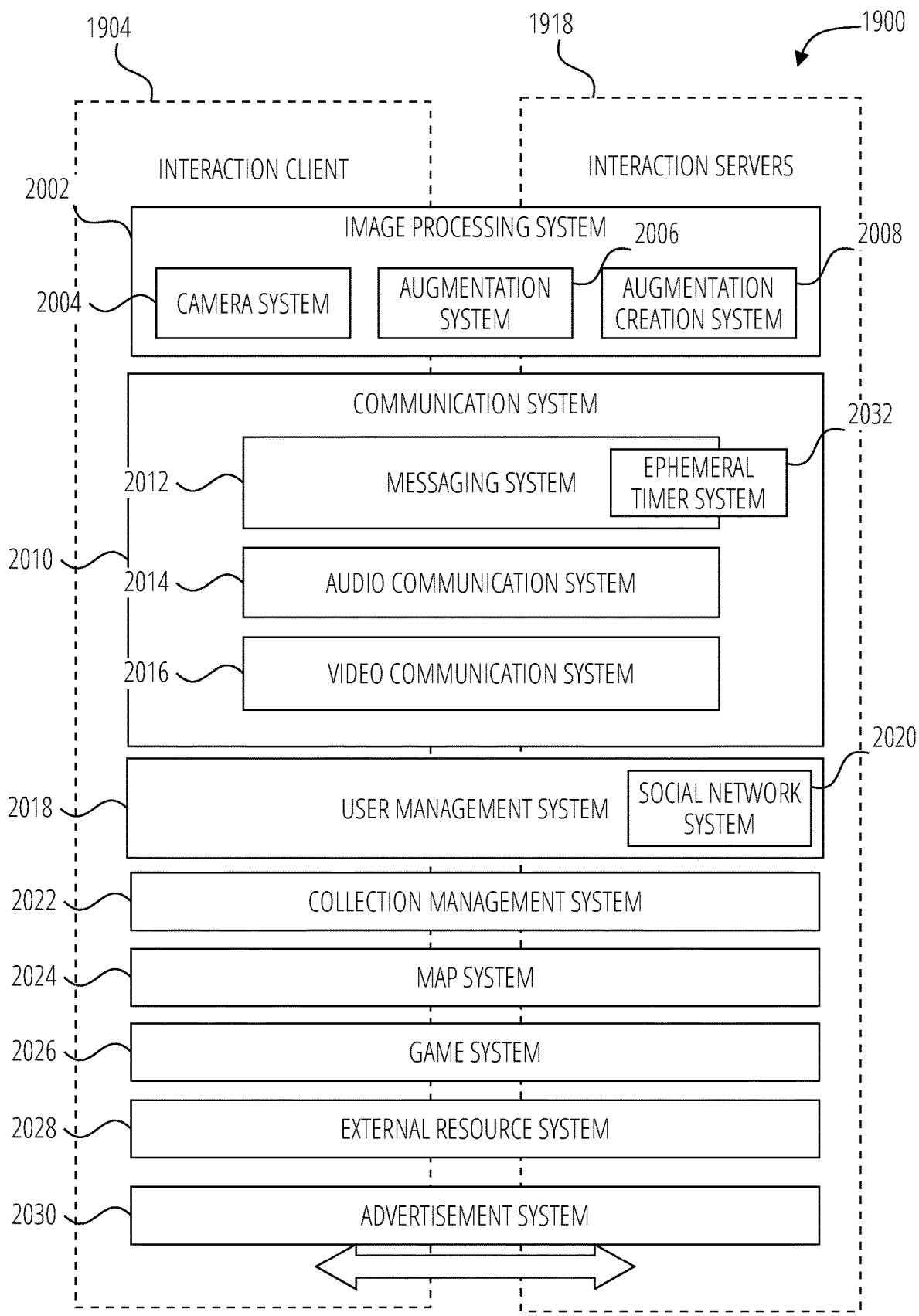
FIG. 20 is a diagrammatic representation of a messaging system, according to some examples, that has both client-side and server-side functionality.

FIG. 20 is a block diagram illustrating further details regarding the interaction system 1900, according to some examples. Specifically, the interaction system 1900 is shown to comprise the interaction client 1904 and the interaction servers 1918. The interaction system 1900 embodies multiple subsystems, which are supported on the client-side by the interaction client 1904 and on the server-side by the interaction servers 1918. Example subsystems are discussed below.

An image processing system 2002 provides various functions that enable a user to capture and augment (e.g., annotate or otherwise modify or edit) media content associated with a message.

A camera system 2004 includes control software (e.g., in a camera application) that interacts and controls hardware camera hardware (e.g., directly or via operating system controls) of the client system 1902 to modify and augment real-time images captured and displayed via the interaction client 1904.

The augmentation system 2006 provides functions related to the generation and publishing of augmentations (e.g., media overlays) for images captured in real-time by cameras of the client system 1902 or retrieved from memory of the client system 1902. For example, the augmentation system 2006 operatively selects, presents, and displays media overlays (e.g., an image filter or an image lens) to the interaction client 1904 for the augmentation of real-time images received via the camera system 2004 or stored images retrieved from memory 2324 of a client system 1902. These augmentations are selected by the augmentation system 2006 and presented to a user of an interaction client 1904, based on number of inputs and data, such as for example:
geolocation of the client system 1902; and
social network information of the user of the client system 1902.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at client system 1902 for communication in a message, or applied to video content, such as a video content stream or feed transmitted from an interaction client 1904. As such, the image processing system 2002 may interact with, and support, the various subsystems of the communication system 2010, such as the messaging system 2012 and the video communication system 2016.

A media overlay may include text or image that can be overlaid on top of a photograph taken by the client system 1902, or a video stream produced by the client system 1902. In some examples, the media overlay may be a location overlay (e.g., Venice beach), a name of a live event, or a name of a merchant overlay (e.g., Beach Coffee House). In further examples, the image processing system 2002 uses the geolocation of the client system 1902 to identify a media overlay that includes the name of a merchant at the geolocation of the client system 1902. The media overlay may include other indicia associated with the merchant. The media overlays may be stored in the databases 1920 and accessed through the database server 1916.

The image processing system 2002 provides a user-based publication platform that enables users to select a geolocation on a map and upload content associated with the selected geolocation. The user may also specify circumstances under which a particular media overlay should be offered to other users. The image processing system 2002 generates a media overlay that includes the uploaded content and associates the uploaded content with the selected geolocation.

The augmentation creation system 2008 supports an augmented reality developer platforms and includes an application for content creators (e.g., artists and developers) to create and publish augmentations (e.g., augmented reality experiences) of the interaction client 1904. The augmentation creation system 2008 provides a library of built-in features and tools including, for example custom shaders, tracking technology, templates, to content creators.

In some examples, the augmentation creation system 2008 provides a merchant-based publication platform that enables merchants to select a particular augmentation associated with a geolocation via a bidding process. For example, the augmentation creation system 2008 associates a media overlay of the highest bidding merchant with a corresponding geolocation for a predefined amount of time.

A communication system 2010 is responsible for enabling and processing multiple forms of communication and interaction within the interaction system 1900 and includes a messaging system 2012, an audio communication system 2014, and a video communication system 2016. The messaging system 2012 is responsible for enforcing the temporary or time-limited access to content by the interaction clients 1904. The messaging system 2012 incorporates multiple timers (e.g., within an ephemeral timer system 2032) that, based on duration and display parameters associated with a message, or collection of messages (e.g., a story), selectively enable access (e.g., for presentation and display) to messages and associated content via the interaction client 1904. Further details regarding the operation of the ephemeral timer system 2032 are provided below. The audio communication system 2014 enables and supports audio communications (e.g., real-time audio chat) between multiple interaction clients 1904. Similarly, the video communication system 2016 enables and supports video communications (e.g., real-time video chat) between multiple interaction clients 1904.

A user management system 2018 is operationally responsible for the management of user data and profiles, and includes a social network system 2020 that maintains information regarding relationships between users of the interaction system 1900.

A collection management system 2022 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 2022 may also be responsible for publishing an icon that provides notification of a particular collection to the user interface of the interaction client 1904. The collection management system 2022 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 2022 employs machine vision (or image recognition technology) and content rules to curate a content collection automatically. In certain examples, compensation may be paid to a user to include user-generated content into a collection. In such cases, the collection management system 2022 operates to automatically make payments to such users to use their content.

A map system 2024 provides various geographic location functions, and supports the presentation of map-based media content and messages by the interaction client 1904. For example, the map system 2024 enables the display of user icons or avatars (e.g., stored in profile data 2116) on a map to indicate a current or past location of "friends" of a user, as well as media content (e.g., collections of messages including photographs and videos) generated by such friends, within the context of a map. For example, a message posted by a user to the interaction system 1900 from a specific geographic location may be displayed within the context of a map at that particular location to "friends" of a specific user on a map interface of the interaction client 1904. A user can furthermore share his or her location and status information (e.g., using an appropriate status avatar) with other users of the interaction system 1900 via the interaction client 1904, with this location and status information being similarly displayed within the context of a map interface of the interaction client 1904 to selected users.

A game system 2026 provides various gaming functions within the context of the interaction client 1904. The interaction client 1904 provides a game interface providing a list of available games that can be launched by a user within the context of the interaction client 1904 and played with other users of the interaction system 1900. The interaction system 1900 further enables a particular user to invite other users to participate in the play of a specific game by issuing invitations to such other users from the interaction client 1904. The interaction client 1904 also supports audio, video, and text messaging (e.g., chats) within the context of gameplay, provides a leaderboard for the games and also supports the provision of in-game rewards (e.g., coins and items).

An external resource system 2028 provides an interface for the interaction client 1904 to communicate with remote servers (e.g., third-party servers 1910) to launch or access external resources, i.e., applications or applets. Each third-party servers 1910 hosts, for example, a markup language (e.g., HTML5) based application or a small-scale version of an application (e.g., game, utility, payment, or ride-sharing application). The interaction client 1904 may launch a web-based resource (e.g., application) by accessing the HTML5 file from the third-party servers 1910 associated with the web-based resource. Applications hosted by third-party servers 1910 are programmed in JavaScript leveraging a Software Development Kit (SDK) provided by the interaction servers 1918. The SDK includes Application Programming Interfaces (APIs) with functions that can be called or invoked by the web-based application. The interaction servers 1918 host a JavaScript library that provides a given external resource access to specific user data of the interaction client 1904. HTML5 is an example of technology for programming games, but applications and resources programmed based on other technologies can be used.

To integrate the functions of the SDK into the web-based resource, the SDK is downloaded by a third-party servers 1910 from the interaction servers 1918 or is otherwise received by the third-party servers 1910. Once downloaded or received, the SDK is included as part of the application code of a web-based external resource. The code of the web-based resource can then call or invoke certain functions of the SDK to integrate features of the interaction client 1904 into the web-based resource.

The SDK stored on the interaction server system 1908 effectively provides the bridge between an external resource (e.g., applications 1906 or applets and the interaction client 1904. This gives the user a seamless experience of communicating with other users on the interaction client 1904, while also preserving the look and feel of the interaction client 1904. To bridge communications between an external resource and an interaction client 1904, the SDK facilitates communication between third-party servers 1910 and the interaction client 1904. A WebViewJavaScriptBridge running on a client system 1902 establishes two one-way communication channels between an external resource and the interaction client 1904. Messages are sent between the external resource and the interaction client 1904 via these communication channels asynchronously. Each SDK function invocation is sent as a message and callback. Each SDK function is implemented by constructing a unique callback identifier and sending a message with that callback identifier.

By using the SDK, not all information from the interaction client 1904 is shared with third-party servers 1910. The SDK limits which information is shared based on the needs of the external resource. Each third-party servers 1910 provides an HTML5 file corresponding to the web-based external resource to interaction servers 1918. The interaction servers 1918 can add a visual representation (such as a box art or other graphic) of the web-based external resource in the interaction client 1904. Once the user selects the visual representation or instructs the interaction client 1904 through a GUI of the interaction client 1904 to access features of the web-based external resource, the interaction client 1904 obtains the HTML5 file and instantiates the resources to access the features of the web-based external resource.

The interaction client 1904 presents a graphical user interface (e.g., a landing page or title screen) for an external resource. During, before, or after presenting the landing page or title screen, the interaction client 1904 determines whether the launched external resource has been previously authorized to access user data of the interaction client 1904. In response to determining that the launched external resource has been previously authorized to access user data of the interaction client 1904, the interaction client 1904 presents another graphical user interface of the external resource that includes functions and features of the external resource. In response to determining that the launched external resource has not been previously authorized to access user data of the interaction client 1904, after a threshold period of time (e.g., 3 seconds) of displaying the landing page or title screen of the external resource, the interaction client 1904 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the interaction client 1904 adds the external resource to a list of authorized external resources and allows the external resource to access user data from the interaction client 1904. The external resource is authorized by the interaction client 1904 to access the user data under an OAuth 2 framework.

The interaction client 1904 controls the type of user data that is shared with external resources based on the type of external resource being authorized. For example, external resources that include full-scale applications (e.g., an application 1906) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 2030 operationally enables the purchasing of advertisements by third parties for presentation to end-users via the interaction clients 1904 and also handles the delivery and presentation of these advertisements.

Data Architecture

Figure 21:
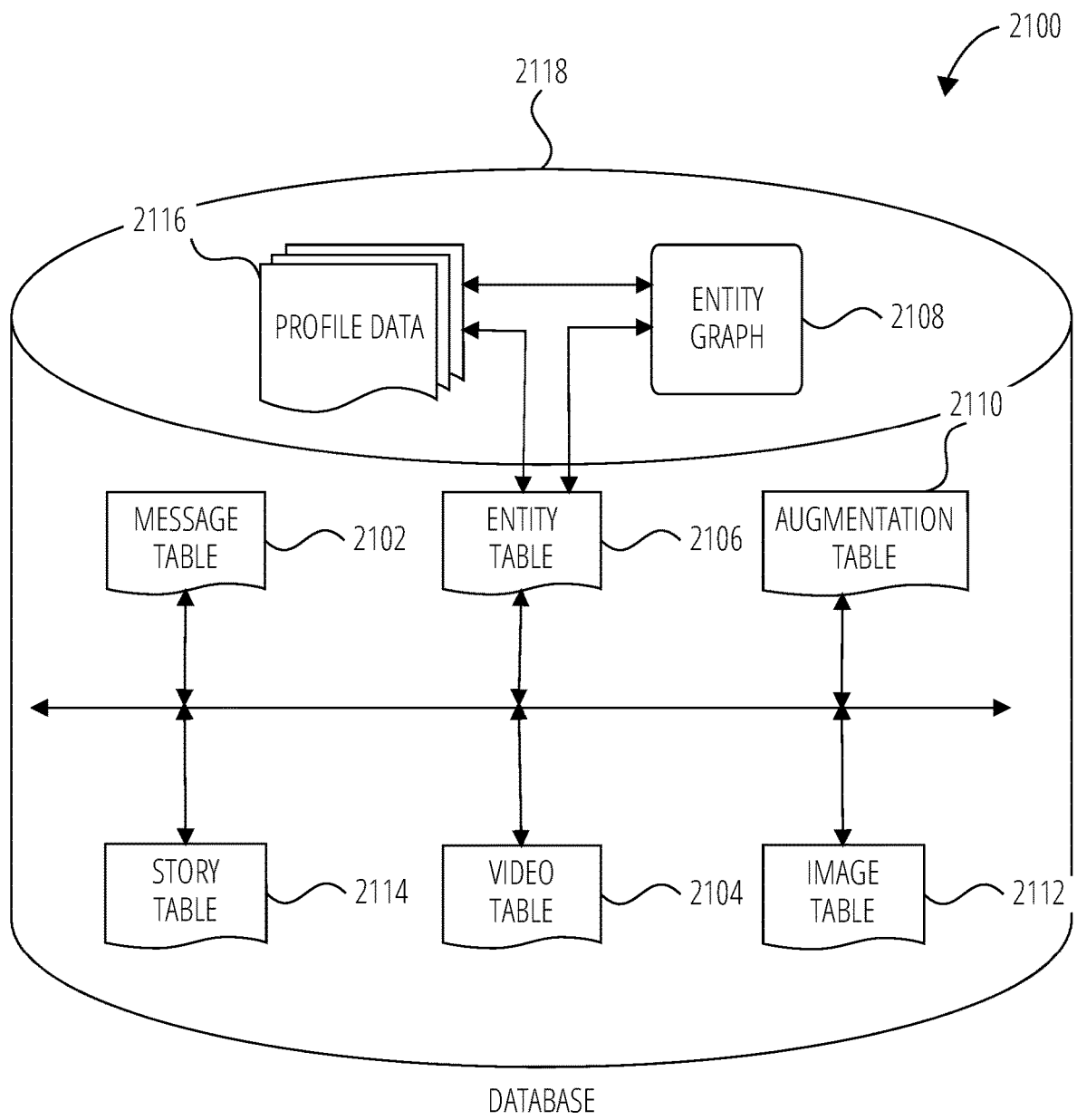
FIG. 21 is a diagrammatic representation of a data structure maintained in a database, according to some examples.

FIG. 21 is a schematic diagram illustrating data structures 2100, which may be stored in the database 2118 of the interaction server system 1908, according to certain examples. While the content of the database 2118 is shown to comprise multiple tables, it will be appreciated that the data could be stored in other types of data structures (e.g., as an object-oriented database).

The database 2118 includes message data stored within a message table 2102. This message data includes, for any particular one message, at least message sender data, message recipient (or receiver) data, and a payload. Further details regarding information that may be included in a message, and included within the message data stored in the message table 2102 is described below with reference to FIG. 21.

An entity table 2106 stores entity data, and is linked (e.g., referentially) to an entity graph 2108 and profile data 2116. Entities for which records are maintained within the entity table 2106 may include individuals, corporate entities, organizations, objects, places, events, and so forth. Regardless of entity type, any entity regarding which the interaction server system 1908 stores data may be a recognized entity. Each entity is provided with a unique identifier, as well as an entity type identifier (not shown).

The entity graph 2108 stores information regarding relationships and associations between entities. Such relationships may be social, professional (e.g., work at a common corporation or organization), interested-based, or activity-based, merely for example.

The profile data 2116 stores multiple types of profile data about a particular entity. The profile data 2116 may be selectively used and presented to other users of the interaction system 1900, based on privacy settings specified by a particular entity. Where the entity is an individual, the profile data 2116 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 1900, and on map interfaces displayed by interaction clients 1904 to other users. The collection of avatar representations may include "status avatars," which present a graphical representation of a status or activity that the user may select to communicate at a particular time.

Where the entity is a group, the profile data 2116 for the group may similarly include one or more avatar representations associated with the group, in addition to the group name, members, and various settings (e.g., notifications) for the relevant group.

The database 2118 also stores augmentation data, such as overlays or filters, in an augmentation table 2110. The augmentation data is associated with and applied to videos (for which data is stored in a video table 2104) and images (for which data is stored in an image table 2112).

Filters, in one example, are overlays that are displayed as overlaid on an image or video during presentation to a recipient user. Filters may be of various types, including user-selected filters from a set of filters presented to a sending user by the interaction client 1904, when the sending user is composing a message. Other types of filters include geolocation filters (also known as geo-filters), which may be presented to a sending user based on geographic location. For example, geolocation filters specific to a neighborhood or special location may be presented within a user interface by the interaction client 1904, based on geolocation information determined by a Global Positioning System (GPS) unit of the client system 1902.

Another type of filter is a data filter, which may be selectively presented to a sending user by the interaction client 1904, based on other inputs or information gathered by the client system 1902 during the message creation process. Examples of data filters include current temperature at a specific location, a current speed at which a sending user is traveling, battery life for a client system 1902, or the current time.

Other augmentation data that may be stored within the image table 2112 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of the client system 1902 and then displayed on a screen of the client system 1902 with the modifications. This also includes modifications to stored content, such as video clips in a collection or group that may be modified. For example, in a client system 1902 with access to multiple augmented reality content items, a user can use a single video clip with multiple augmented reality content items to see how the different augmented reality content items will modify the stored clip. Similarly, real-time video capture may be use modifications to show how video images currently being captured by sensors of a client system 1902 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In some examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each element of the object. This mesh is used in the following stage of tracking the elements of the object in the video stream. In the process of tracking, the mesh for each element is aligned with a position of each element. Then, additional points are generated on the mesh.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing the color of areas; removing some part of areas from the frames of the video stream; including new objects into areas that are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image using a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

A transformation system can capture an image or video stream on a client device (e.g., the client system 1902) and perform complex image manipulations locally on the client system 1902 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client system 1902.

In some examples, a computer animation model to transform image data can be used by a system where a user may capture an image or video stream of the user (e.g., a selfie) using the client system 1902 having a neural network operating as part of an interaction client 1904 operating on the client system 1902. The transformation system operating within the interaction client 1904 determines the presence of a face within the image or video stream and provides modification icons associated with a computer animation model to transform image data, or the computer animation model can be present as associated with an interface described herein. The modification icons include changes that are the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client system 1902 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 2114 stores data regarding collections of messages and associated image, video, or audio data, which are compiled into a collection (e.g., a story or a gallery). The creation of a particular collection may be initiated by a particular user (e.g., each user for which a record is maintained in the entity table 2106). A user may create a "personal story" in the form of a collection of content that has been created and sent/broadcast by that user. To this end, the user interface of the interaction client 1904 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the interaction client 1904, to contribute content to a particular live story. The live story may be identified to the user by the interaction client 1904, based on his or her location. The end result is a "live story" told from a community perspective.

A further type of content collection is known as a "location story," which enables a user whose client system 1902 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 2104 stores video data that, in one example, is associated with messages for which records are maintained within the message table 2102. Similarly, the image table 2112 stores image data associated with messages for which message data is stored in the entity table 2106. The entity table 2106 may associate various augmentations from the augmentation table 2110 with various images and videos stored in the image table 2112 and the video table 2104.

Data Communications Architecture

Figure 22:
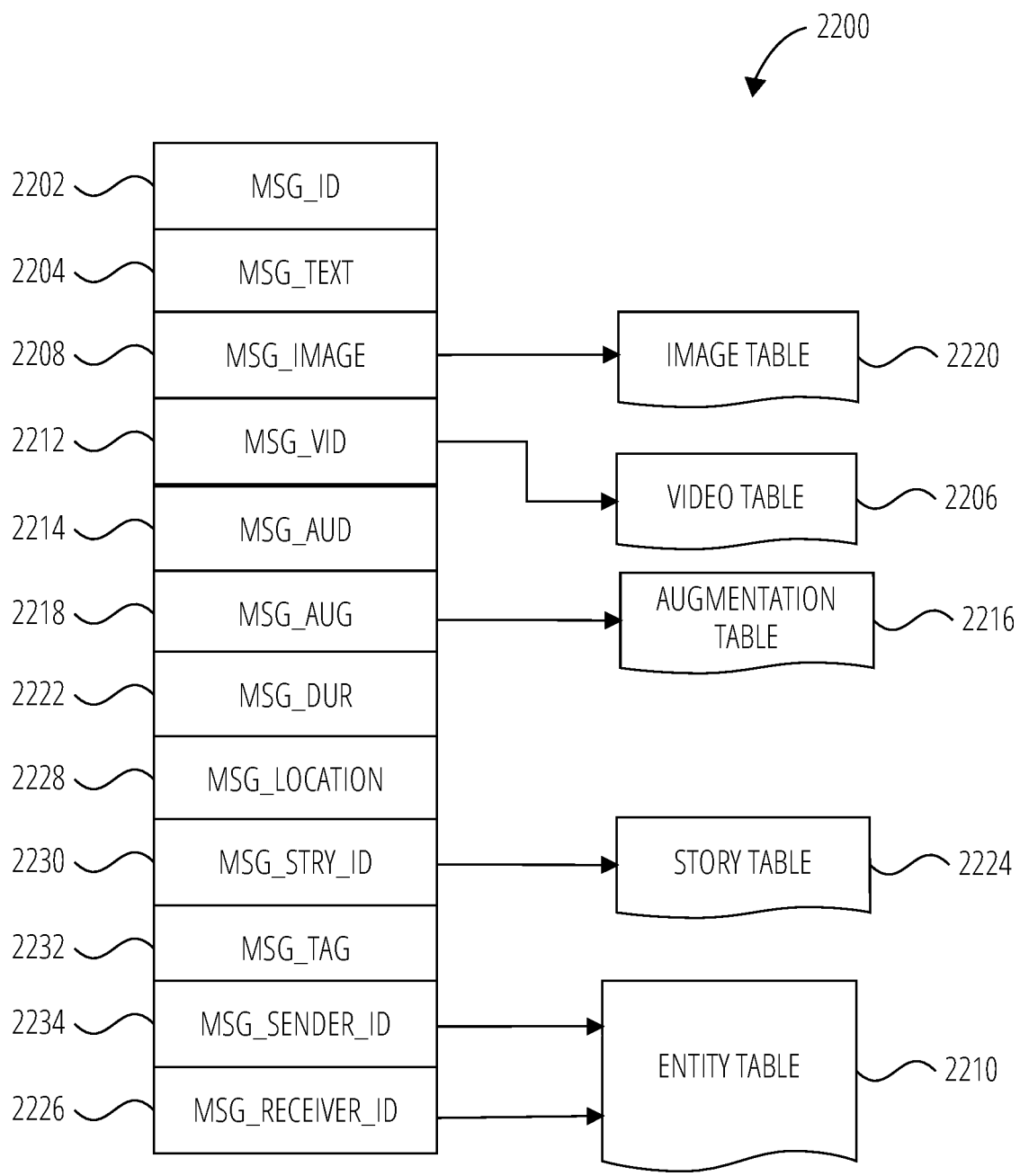
FIG. 22 is a diagrammatic representation of a message, according to some examples.

FIG. 22 is a schematic diagram illustrating a structure of a message 2200, according to some examples, generated by an interaction client 1904 for communication to a further interaction client 1904 via the interaction servers 1918. The content of a particular message 2200 is used to populate the message table 2102 stored within the database 1920, accessible by the interaction servers 1918. Similarly, the content of a message 2200 is stored in memory as "in-transit" or "in-flight" data of the client system 1902 or the interaction servers 1918. A message 2200 is shown to include the following example components:

- message identifier 2202: a unique identifier that identifies the message 2200.
- message text payload 2204: text, to be generated by a user via a user interface of the client system 1902, and that is included in the message 2200.
- message image payload 2208: image data, captured by a camera component of a client system 1902 or retrieved from a memory component of a client system 1902, and that is included in the message 2200. Image data for a sent or received message 2200 may be stored in the image table 2220.
- message video payload 2212: video data, captured by a camera component or retrieved from a memory component of the client system 1902, and that is included in the message 2200. Video data for a sent or received message 2200 may be stored in the video table 2206.
- message audio payload 2214: audio data, captured by a microphone or retrieved from a memory component of the client system 1902 and that is included in the message 2200.
- message augmentation data 2218: augmentation data (e.g., filters, stickers, or other annotations or enhancements) that represents augmentations to be applied to message image payload 2208, message video payload 2212, or message audio payload 2214 of the message 2200. Augmentation data for a sent or received message 2200 may be stored in the augmentation table 2216.
- message duration parameter 2222: parameter value indicating, in seconds, the amount of time for which content of the message (e.g., the message image payload 2208, message video payload 2212, message audio payload 2214) is to be presented or made accessible to a user via the interaction client 1904.
- message geolocation parameter 2228: geolocation data (e.g., latitudinal, and longitudinal coordinates) associated with the content payload of the message. Multiple message geolocation parameter 2228 values may be included in the payload, each of these parameter values being associated with respect to content items included in the content (e.g., a specific image into within the message image payload 2208, or a specific video in the message video payload 2212).
- message story identifier 2230: identifier values identifying one or more content collections (e.g., "stories" identified in the story table 2224) with which a particular content item in the message image payload 2208 of the message 2200 is associated. For example, multiple images within the message image payload 2208 may each be associated with multiple content collections using identifier values.

message tag 2232: each message 2200 may be tagged with multiple tags, each of which is indicative of the subject matter of content included in the message payload. For example, where a particular image included in the message image payload 2208 depicts an animal (e.g., a lion), a tag value may be included within the message tag 2232 that is indicative of the relevant animal. Tag values may be generated manually, based on user input, or may be automatically generated using, for example, image recognition.

message sender identifier 2234: an identifier (e.g., a messaging system identifier, email address, or device identifier) indicative of a user of the client system 1902 on which the message 2200 was generated and from which the message 2200 was sent.

message receiver identifier 2226: an identifier (e.g., a messaging system identifier, email address, or device identifier) indicative of a user of the client system 1902 to which the message 2200 is addressed.

The contents (e.g., values) of the various components of message 2200 may be pointers to locations in tables within which content data values are stored. For example, an image value in the message image payload 2208 may be a pointer to (or address of) a location within an image table 2220. Similarly, values within the message video payload 2212 may point to data stored within a video table 2206, values stored within the message augmentations 412 may point to data stored in an augmentation table 2216, values stored within the message story identifier 2230 may point to data stored in a story table 2224, and values stored within the message sender identifier 2234 and the message receiver identifier 2226 may point to user records stored within an entity table 2210.

System with Head-Wearable Apparatus

Figure 23:
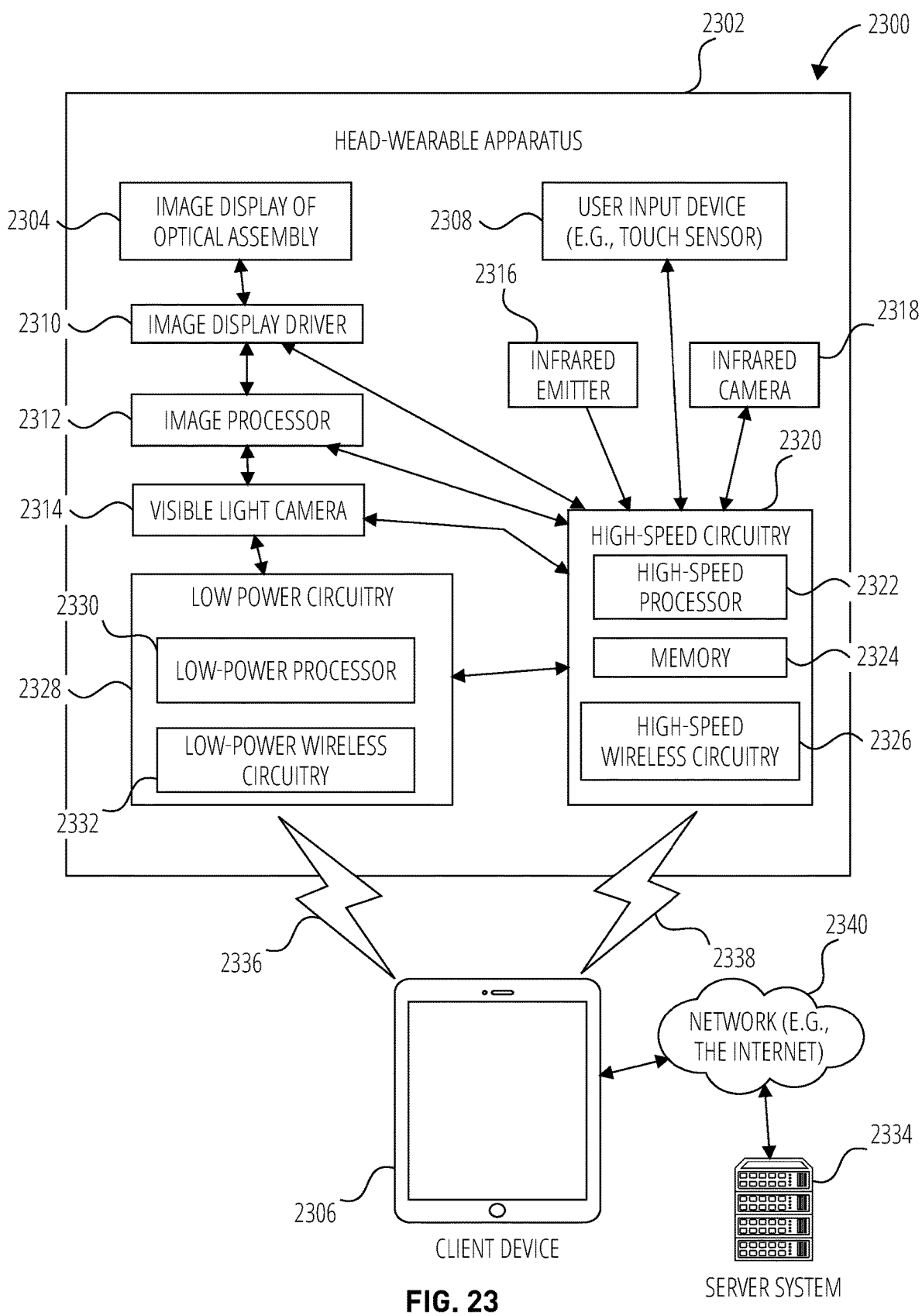
FIG. 23 illustrates a system in which the head-wearable apparatus with a selector input device, according to some examples.

FIG. 23 illustrates a system 2300 in which the head-wearable apparatus 2302 with a selector input device can be implemented according to some examples. FIG. 23 is a high-level functional block diagram of an example head-wearable apparatus 2302 communicatively coupled a mobile client device 2306 and a server system 2334 via various network 2340.

Head-wearable apparatus 2302 includes a camera, such as at least one of visible light camera 2314, infrared emitter 2316 and infrared camera 2318.

Client device 2306 can be capable of connecting with head-wearable apparatus 2302 using both a low-power wireless connection 2336 and a high-speed wireless connection 2338. Client device 2306 is connected to server system 2334 and network 2340. The network 2340 may include any combination of wired and wireless connections.

Head-wearable apparatus 2302 further includes two image displays of the image display of optical assembly 2304. The two image displays of optical assembly 2304 include one associated with the left lateral side and one associated with the right lateral side of the head-wearable apparatus 2302. Head-wearable apparatus 2302 also includes image display driver 2310, image processor 2312, low-power low power circuitry 2328, and high-speed circuitry 2320. Image display of optical assembly 2304 are for presenting images and videos, including an image that can include a graphical user interface to a user of the head-wearable apparatus 2302.

Image display driver 2310 commands and controls the image display of the image display of optical assembly 2304. Image display driver 2310 may deliver image data directly to the image display of the image display of optical assembly 2304 for presentation or may have to convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

Head-wearable apparatus 2302 includes a user input device 2308 (e.g., touch sensor or push button) including an input surface on the head-wearable apparatus 2302. The user input device 2308 (e.g., touch sensor or push button) is to receive from the user an input selection to manipulate the graphical user interface of the presented image.

The components shown in FIG. 23 for the head-wearable apparatus 2302 are located on one or more circuit boards, for example a PCB or flexible PCB, in the rims or temples. Alternatively, or additionally, the depicted components can be located in the chunks, frames, hinges, or bridge of the head-wearable apparatus 2302. Left and right visible light cameras 2314 can include digital camera elements such as a complementary metal—oxide—semiconductor (CMOS) image sensor, charge coupled device, a camera lenses, or any other respective visible or light capturing elements that may be used to capture data, including images of scenes with unknown objects.

Head-wearable apparatus 2302 includes a memory 2324 which stores instructions to perform a subset or all of the functions described herein. Memory 2324 can also include storage device.

As shown in FIG. 23, high-speed circuitry 2320 includes high-speed processor 2322, memory 2324, and high-speed wireless circuitry 2326. In the example, the image display driver 2310 is coupled to the high-speed circuitry 2320 and operated by the high-speed processor 2322 in order to drive the left and right image displays of the image display of optical assembly 2304. High-speed processor 2322 may be any processor capable of managing high-speed communications and operation of any general computing system needed for head-wearable apparatus 2302. High-speed processor 2322 includes processing resources needed for managing high-speed data transfers on high-speed wireless connection 2338 to a wireless local area network (WLAN) using high-speed wireless circuitry 2326. In certain examples, the high-speed processor 2322 executes an operating system such as a LINUX operating system or other such operating system of the head-wearable apparatus 2302 and the operating system is stored in memory 2324 for execution. In addition to any other responsibilities, the high-speed processor 2322 executing a software architecture for the head-wearable apparatus 2302 is used to manage data transfers with high-speed wireless circuitry 2326. In certain examples, high-speed wireless circuitry 2326 is configured to implement Institute of Electrical and Electronic Engineers (IEEE) 802.11 communication standards, also referred to herein as Wi-Fi. In some examples, other high-speed communications standards may be implemented by high-speed wireless circuitry 2326.

Low-power wireless circuitry 2332 and the high-speed wireless circuitry 2326 of the head-wearable apparatus 2302 can include short range transceivers (Bluetooth™) and wireless wide, local, or wide area network transceivers (e.g., cellular or WiFi). Client device 2306, including the transceivers communicating via the low-power wireless connection 2336 and high-speed wireless connection 2338, may be implemented using details of the architecture of the head-wearable apparatus 2302, as can other elements of network 2340.

Memory 2324 includes any storage device capable of storing various data and applications, including, among other things, camera data generated by the left and right visible light cameras 2314, infrared camera 2318, and the image processor 2312, as well as images generated for display by the image display driver 2310 on the image displays of the image display of optical assembly 2304. While memory 2324 is shown as integrated with high-speed circuitry 2320, in some examples, memory 2324 may be an independent standalone element of the head-wearable apparatus 2302. In certain such examples, electrical routing lines may provide a connection through a chip that includes the high-speed processor 2322 from the image processor 2312 or low-power processor 2330 to the memory 2324. In some examples, the high-speed processor 2322 may manage addressing of memory 2324 such that the low-power processor 2330 will boot the high-speed processor 2322 any time that a read or write operation involving memory 2324 is needed.

As shown in FIG. 23, the low-power processor 2330 or high-speed processor 2322 of the head-wearable apparatus 2302 can be coupled to the camera (visible light camera 2314; infrared emitter 2316, or infrared camera 2318), the image display driver 2310, the user input device 2308 (e.g., touch sensor or push button), and the memory 2324.

Head-wearable apparatus 2302 is connected with a host computer. For example, the head-wearable apparatus 2302 is paired with the client device 2306 via the high-speed wireless connection 2338 or connected to the server system 2334 via the network 2340. Server system 2334 may be one or more computing devices as part of a service or network computing system, for example, that include a processor, a memory, and network communication interface to communicate over the network 2340 with the client device 2306 and head-wearable apparatus 2302.

The client device 2306 includes a processor and a network communication interface coupled to the processor. The network communication interface allows for communication over the network 2340, low-power wireless connection 2336 or high-speed wireless connection 2338. Client device 2306 can further store at least portions of the instructions for generating a binaural audio content in the client device 2306's memory to implement the functionality described herein.

Output components of the head-wearable apparatus 2302 include visual components, such as a display such as a liquid crystal display (LCD), a plasma display panel (PDP), a light emitting diode (LED) display, a projector, or a waveguide. The image displays of the optical assembly are driven by the image display driver 2310. The output components of the head-wearable apparatus 2302 further include acoustic components (e.g., speakers), haptic components (e.g., a vibratory motor), other signal generators, and so forth. The input components of the head-wearable apparatus 2302, the client device 2306, and server system 2334, such as the user input device 2308, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Head-wearable apparatus 2302 may optionally include additional peripheral device elements. Such peripheral device elements may include biometric sensors, additional sensors, or display elements integrated with head-wearable apparatus 2302. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 2336 and high-speed wireless connection 2338 from the client device 2306 via the low-power wireless circuitry 2332 or high-speed wireless circuitry 2326.

Where a phrase similar to "at least one of A, B, or C," "at least one of A, B, and C," "one or more A, B, or C," or "one or more of A, B, and C" is used, it is intended that the phrase be interpreted to mean that A alone may be present in an example, B alone may be present in an example, C alone may be present in an example, or that any combination of the elements A, B and C may be present in a single example; for example, A and B, A and C, B and C, or A and B and C.

Changes and modifications may be made to the disclosed examples without departing from the scope of the present disclosure. These and other changes or modifications are intended to be included within the scope of the present disclosure, as expressed in the following claims.

Machine Architecture

Figure 24:
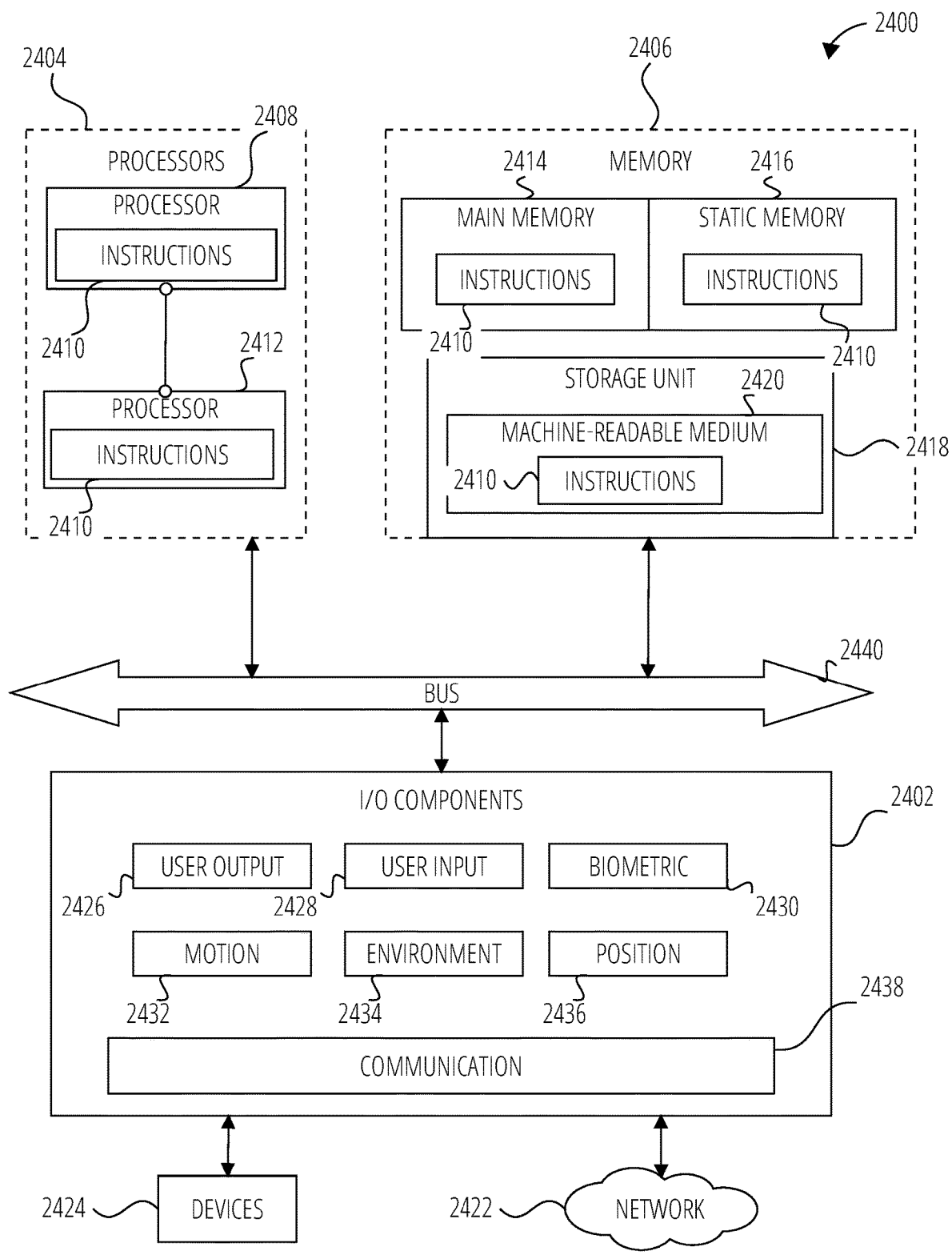
FIG. 24 is a diagrammatic representation of a machine in the form of a computer system within which a set of instructions may be executed for causing the machine to perform any one or more of the methodologies discussed herein, according to some examples.

FIG. 24 is a diagrammatic representation of the machine 2400 within which instructions 2410 (e.g., software, a program, an application, an applet, an app, or other executable code) for causing the machine 2400 to perform any one or more of the methodologies discussed herein may be executed. For example, the instructions 2410 may cause the machine 2400 to execute any one or more of the methods described herein. The instructions 2410 transform the general, non-programmed machine 2400 into a particular machine 2400 programmed to carry out the described and illustrated functions in the manner described. The machine 2400 may operate as a standalone device or may be coupled (e.g., networked) to other machines. In a networked deployment, the machine 2400 may operate in the capacity of a server machine or a client machine in a server-client network environment, or as a peer machine in a peer-to-peer (or distributed) network environment. The machine 2400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 2410, sequentially or otherwise, that specify actions to be taken by the machine 2400. Further, while a single machine 2400 is illustrated, the term "machine" shall also be taken to include a collection of machines that individually or jointly execute the instructions 2410 to perform any one or more of the methodologies discussed herein. The machine 2400, for example, may comprise the client system 1902 or any one of multiple server devices forming part of the interaction server system 1908. In some examples, the machine 2400 may also comprise both client and server systems, with certain operations of a particular method or algorithm being performed on the server-side and with certain operations of the particular method or algorithm being performed on the client-side.

The machine 2400 may include processors 2404, memory 2406, and input/output I/O components 2402, which may be configured to communicate with each other via a bus 2440. In an example, the processors 2404 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 2408 and a processor 2412 that execute the instructions 2410. The term "processor" is intended to include multi-core processors that may comprise two or more independent processors (sometimes referred to as "cores") that may execute instructions contemporaneously. Although FIG. 24 shows multiple processors 2404, the machine 2400 may include a single processor with a single-core, a single processor with multiple cores (e.g., a multi-core processor), multiple processors with a single core, multiple processors with multiples cores, or any combination thereof.

The memory 2406 includes a main memory 2414, a static memory 2416, and a storage unit 2418, both accessible to the processors 2404 via the bus 2440. The main memory 2406, the static memory 2416, and storage unit 2418 store the instructions 2410 embodying any one or more of the methodologies or functions described herein. The instructions 2410 may also reside, completely or partially, within the main memory 2414, within the static memory 2416, within machine-readable medium 2420 within the storage unit 2418, within at least one of the processors 2404 (e.g., within the Processor's cache memory), or any suitable combination thereof, during execution thereof by the machine 2400.

The I/O components 2402 may include a wide variety of components to receive input, provide output, produce output, transmit information, exchange information, capture measurements, and so on. The specific I/O components 2402 that are included in a particular machine will depend on the type of machine. For example, portable machines such as mobile phones may include a touch input device or other such input mechanisms, while a headless server machine will likely not include such a touch input device. It will be appreciated that the I/O components 2402 may include many other components that are not shown in FIG. 24. In various examples, the I/O components 2402 may include user output components 2426 and user input components 2428. The user output components 2426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 2428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 2402 may include biometric components 2430, motion components 2432, environmental components 2434, or position components 2436, among a wide array of other components. For example, the biometric components 2430 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 2432 include acceleration sensor components (e.g., accelerometer), gravitation sensor components, rotation sensor components (e.g., gyroscope).

The environmental components 2434 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client system 1902 may have a camera system comprising, for example, front cameras on a front surface of the client system 1902 and rear cameras on a rear surface of the client system 1902. The front cameras may, for example, be used to capture still images and video of a user of the client system 1902 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client system 1902 may also include a 360° camera for capturing 360° photographs and videos.

Further, the camera system of the client system 1902 may include dual rear cameras (e.g., a primary camera as well as a depth-sensing camera), or even triple, quad or penta rear camera configurations on the front and rear sides of the client system 1902. These multiple cameras systems may include a wide camera, an ultra-wide camera, a telephoto camera, a macro camera, and a depth sensor, for example.

The position components 2436 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2402 further include communication components 2438 operable to couple the machine 2400 to a network 2422 or devices 2424 via respective coupling or connections. For example, the communication components 2438 may include a network interface Component or another suitable device to interface with the network 2422. In further examples, the communication components 2438 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2424 may be another machine or any of a wide variety of peripheral devices (e.g., a peripheral device coupled via a USB).

Moreover, the communication components 2438 may detect identifiers or include components operable to detect identifiers. For example, the communication components 2438 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2438, such as location via Internet Protocol (IP) geolocation, location via Wi-Fi® signal triangulation, location via detecting an NFC beacon signal that may indicate a particular location, and so forth.

The various memories (e.g., main memory 2414, static memory 2416, and memory of the processors 2404) and storage unit 2418 may store one or more sets of instructions and data structures (e.g., software) embodying or used by any one or more of the methodologies or functions described herein. These instructions (e.g., the instructions 2410), when executed by processors 2404, cause various operations to implement the disclosed examples.

The instructions 2410 may be transmitted or received over the network 2422, using a transmission medium, via a network interface device (e.g., a network interface component included in the communication components 2438) and using any one of several well-known transfer protocols (e.g., hypertext transfer protocol (HTTP)). Similarly, the instructions 2410 may be transmitted or received using a transmission medium via a coupling (e.g., a peer-to-peer coupling) to the devices 2424.

Software Architecture

Figure 25:
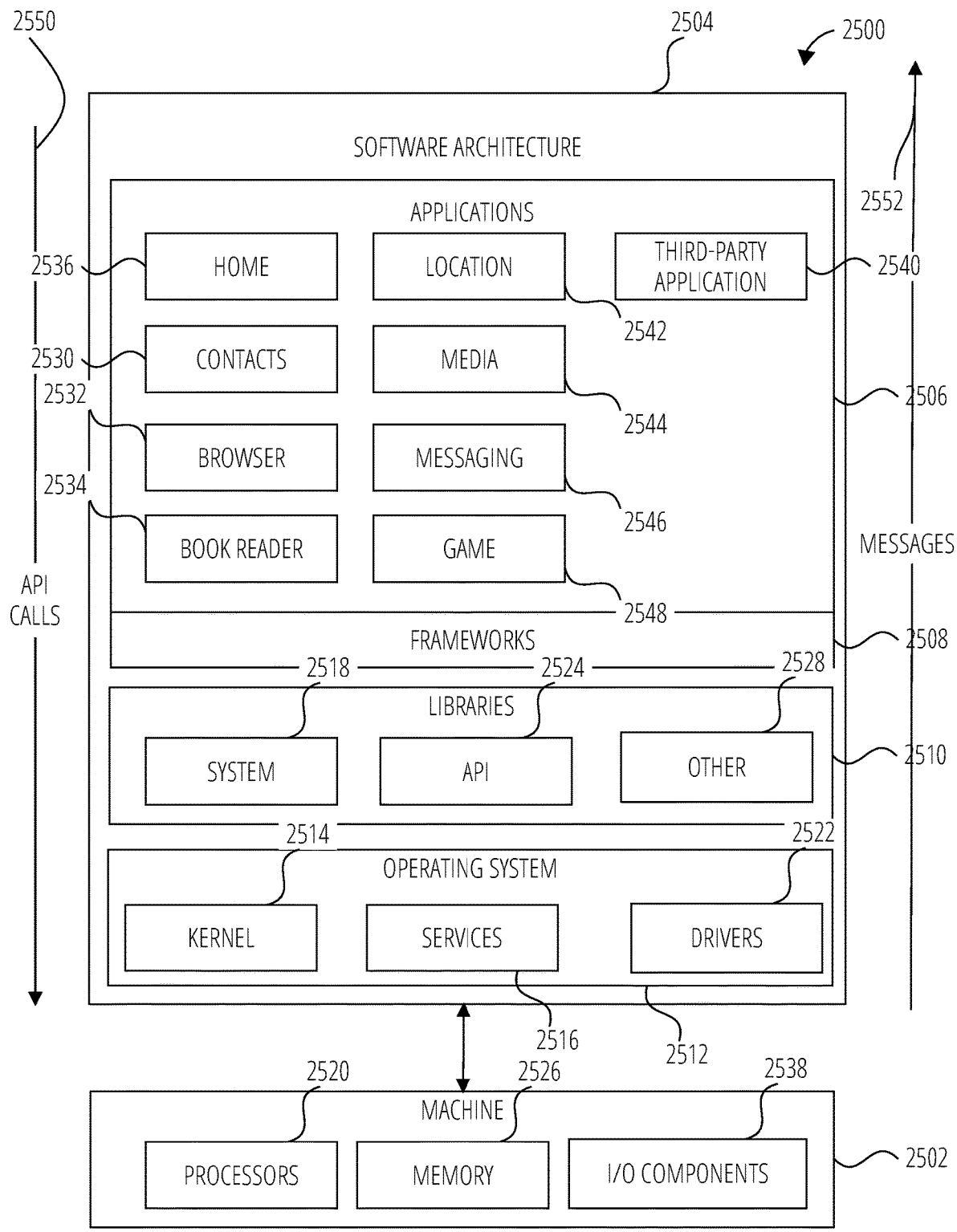
FIG. 25 is a block diagram showing a software architecture within which examples may be implemented.

FIG. 25 is a block diagram 2500 illustrating a software architecture 2504, which can be installed on any one or more of the devices described herein. The software architecture 2504 is supported by hardware such as a machine 2502 that includes processors 2520, memory 2526, and I/O components 2538. In this example, the software architecture 2504 can be conceptualized as a stack of layers, where each layer provides a particular functionality. The software architecture 2504 includes layers such as an operating system 2512, libraries 2510, frameworks 2508, and applications 2506. Operationally, the applications 2506 invoke API calls 2550 through the software stack and receive messages 2552 in response to the API calls 2550.

The operating system 2512 manages hardware resources and provides common services. The operating system 2512 includes, for example, a kernel 2514, services 2516, and drivers 2522. The kernel 2514 acts as an abstraction layer between the hardware and the other software layers. For example, the kernel 2514 provides memory management, processor management (e.g., scheduling), component management, networking, and security settings, among other functionalities. The services 2516 can provide other common services for the other software layers. The drivers 2522 are responsible for controlling or interfacing with the underlying hardware. For instance, the drivers 2522 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 2510 provide a common low-level infrastructure used by the applications 2506. The libraries 2510 can include system libraries 2518 (e.g., C standard library) that provide functions such as memory allocation functions, string manipulation functions, mathematic functions, and the like. In addition, the libraries 2510 can include API libraries 2524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 2510 can also include a wide variety of other libraries 2528 to provide many other APIs to the applications 2506.

The frameworks 2508 provide a common high-level infrastructure that is used by the applications 2506. For example, the frameworks 2508 provide various graphical user interface (GUI) functions, high-level resource management, and high-level location services. The frameworks 2508 can provide a broad spectrum of other APIs that can be used by the applications 2506, some of which may be specific to a particular operating system or platform.

In an example, the applications 2506 may include a home application 2536, a contacts application 2530, a browser application 2532, a book reader application 2534, a location application 2542, a media application 2544, a messaging application 2546, a game application 2548, and a broad assortment of other applications such as a third-party application 2540. The applications 2506 are programs that execute functions defined in the programs. Various programming languages can be employed to create one or more of the applications 2506, structured in a variety of manners, such as object-oriented programming languages (e.g., Objective-C, Java, or C++) or procedural programming languages (e.g., C or assembly language). In a specific example, the third-party application 2540 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system.

In this example, the third-party application 2540 can invoke the API calls 2550 provided by the operating system 2512 to facilitate functionality described herein.

CONCLUSION

The present disclosure relates to a method for creating a three-dimensional (3D) model of a reference surface. A person having ordinary skill in the art who wants to create a 3D model would face three technical difficulties: 1. The 3D model cannot be accurate in both shape and structure information and in location tracking information. 2. If multiple models are used, the models cannot be aligned. 3. The generated 3D model cannot be easily shared with others and others cannot use the shared model easily. The present disclosure solves all of the technical difficulties. Specifically, by combining a 3D data representation which records accurate shape and structure information and location tracking data representation which records accurate location tracking information, the 3D model can be accurate in both shape and structure information and in location tracking information. Also, the present disclosure provides a method of aligning the location tracking data representation with the 3D data representation by a careful adjustment of position and orientation of frames in the location tracking data representation. The present disclosure also provides an easy way of sharing the created 3D model by uploading a created 3D model to a database with an identifier and downloading the uploaded 3D model using the identifier.

GLOSSARY

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method for creating a three-dimensional (3D) model of a reference surface of a reference object, the method comprising:
   capturing, using a capture device, a plurality of data points on the reference surface of the reference object;
   determining a position and an orientation of the capture device related to the capture of the plurality of data points;
   creating a 3D data representation of the reference surface of the reference object based on the plurality of data points captured by the capture device;
   creating a location tracking data representation of the reference surface of the reference object based on the plurality of data points on the reference surface of the reference object and the position and the orientation of the capture device;
   creating the 3D model of the reference surface of the reference object based on the 3D data representation and the location tracking data representation of the reference surface of the reference object; and
   making the 3D model of the reference surface available to users who are physically located at a geographic location of the reference surface of the reference object,
   wherein the creating the location tracking data representation of the reference surface comprises:

creating a frame, the frame corresponding to the position and the orientation of the capture device;
associating the frame with a set of data points of the plurality of data points;
creating the location tracking data representation based on the frame and the associated set of data points; and
aligning the location tracking data representation with the 3D data representation by performing an adjustment on the frame, the performing of the adjustment comprising:
adjusting the position of the frame according to an original position of the capture device; and
adjusting the orientation of the frame according to gravitational direction information of the capture device.

2. The method of claim 1, further comprising:
uploading the 3D model of the reference surface to a server system;
associating an identifier with the 3D model of the reference surface at the server system; and
making the 3D model of the reference surface available to the users of the server system who are physically located at the geographic location of the reference surface of the reference object using the identifier.

3. The method of claim 2, wherein the identifier is associated with the geographic location of the reference surface of the reference object.

4. The method of claim 2, wherein the making available of the 3D model comprises:
enabling the users to augment the 3D model with augmentations to create augmented image data superimposed on the reference surface as an augmented reality superimposition, wherein the augmented reality superimposition is visible to a second user who downloads and uses the 3D model.

5. The method of claim 1, wherein the position and the orientation of the capture device is determined by a SLAM tracking system of the capture device.

6. The method of claim 1, wherein the 3D data representation is a 3D mesh.

7. The method of claim 1, wherein the location tracking data representation is a 3D sparse map.

8. The method of claim 1, wherein the capture device comprises a camera system and a Laser Imagining, Detection, and Ranging (LIDAR) system.

9. The method of claim 1, wherein the creating the 3D data representation comprises capturing data under a plurality of lighting conditions using the capture device and amalgamating the capture data to create the 3D data representation.

10. A computing apparatus comprising:
a processor; and
a memory storing instructions that, when executed by the processor, configure the apparatus to:
capture, using a capture device, a plurality of data points on a reference surface of a reference object;
determine a position and an orientation of the capture device related to the capture of the plurality of data points;
create a 3D data representation of the reference surface of the reference object based on the plurality of data points captured by the capture device;
create a location tracking data representation of the reference surface of the reference object based the plurality of data points on the reference surface of the reference object and the position and the orientation of the capture device;
create a 3D model of the reference surface of the reference object based on the 3D data representation and the location tracking data representation of the reference surface of the reference object; and
make the 3D model of the reference surface available to users who are physically located at a geographic location of the reference surface of the reference object,
wherein to create the location tracking data representation of the reference surface, the instructions configure the apparatus to:
create a frame, the frame corresponding to the position and the orientation of the capture device;
associate the frame with a set of data points of the plurality of data points;
create the location tracking data representation based on the frame and the associated set of data points; and
align the location tracking data representation with the 3D data representation by performing an adjustment on the frame, the performing of the adjustment comprising:
adjusting the position of the frame according to an original position of the capture device; and
adjusting the orientation of the frame according to gravitational direction information of the capture device.

11. The computing apparatus of claim 10, wherein to make the 3D model available, the instructions further configure the apparatus to:
enable the users to augment the 3D model with augmentations to create augmented image data superimposed on the reference surface as an augmented reality superimposition, wherein the augmented reality superimposition is visible to a second user who downloads and uses the 3D model.

12. The computing apparatus of claim 10, wherein to create the location track data representation of the reference surface, the instructions configure the apparatus to:
create a frame, the frame corresponding to the position and the orientation of the capture device;
associate the frame with a set of data points of the plurality of data points; and
create the location tracking data representation based on the frame and the associated set of data points.

13. The computing apparatus of claim 12, wherein to create the location track data representation of the reference surface, the instructions further configure the apparatus to:
align the location tracking data representation with the 3D data representation by performing an adjustment on the frame.

14. A non-transitory computer-readable storage medium, the computer-readable storage medium including instructions that when executed by a computer, cause the computer to:
capture, using a capture device, a plurality of data points on a reference surface of a reference object;
determine a position and an orientation of the capture device related to the capture of the plurality of data points;
create a 3D data representation of the reference surface of the reference object based on the plurality of data points captured by the capture device;
create a location tracking data representation of the reference surface of the reference object based the plurality of data points on the reference surface of the reference object and the position and the orientation of the capture device;

create a 3D model of the reference surface of the reference object based on the 3D data representation and the location tracking data representation of the reference surface of the reference object; and make the 3D model of the reference surface available to users who are physically located at a geographic location of the reference surface of the reference object, wherein to create the location tracking data representation of the reference surface, the instructions further cause the computer to:

create a frame, the frame corresponding to the position and the orientation of the capture device;

associate the frame with a set of data points of the plurality of data points;

create the location tracking data representation based on the frame and the associated set of data points; and align the location tracking data representation with the 3D data representation by performing an adjustment on the frame, the performing of the adjustment comprising:

adjusting the position of the frame according to an original position of the capture device; and adjusting the orientation of the frame according to gravitational direction information of the capture device.

* * * * *